(12) United States Patent
Lange et al.

(10) Patent No.: US 9,951,254 B2
(45) Date of Patent: Apr. 24, 2018

(54) COMPOSITIONS CONTAINING ETHYLENE POLYMERS

(71) Applicant: ARIZONA CHEMICAL COMPANY, LLC, Jacksonville, FL (US)

(72) Inventors: Josephus Hubertus Maria Lange, Almere (NL); Mark C Schaapman, Almere (NL); Erik Kelderman, Almere (NL)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days.

(21) Appl. No.: 15/025,112

(22) PCT Filed: Sep. 26, 2014

(86) PCT No.: PCT/US2014/057641
§ 371 (c)(1),
(2) Date: Mar. 25, 2016

(87) PCT Pub. No.: WO2015/048402
PCT Pub. Date: Apr. 2, 2015

(65) Prior Publication Data
US 2016/0222259 A1    Aug. 4, 2016

Related U.S. Application Data

(60) Provisional application No. 61/883,803, filed on Sep. 27, 2013.

(51) Int. Cl.
| | | |
|---|---|---|
| *C09J 131/04* | (2006.01) | |
| *C09J 133/08* | (2006.01) | |
| *C08L 23/08* | (2006.01) | |
| *C08L 93/04* | (2006.01) | |
| *C09J 193/04* | (2006.01) | |
| *C08K 5/00* | (2006.01) | |
| *C08K 5/375* | (2006.01) | |

(52) U.S. Cl.
CPC ......... *C09J 131/04* (2013.01); *C08L 23/0846* (2013.01); *C08L 93/04* (2013.01); *C09J 133/08* (2013.01); *C09J 193/04* (2013.01); *C08K 5/005* (2013.01); *C08K 5/375* (2013.01)

(58) Field of Classification Search
CPC .............................. C09J 131/04; C09J 133/08
See application file for complete search history.

(56) References Cited

U.S. PATENT DOCUMENTS

| | | |
|---|---|---|
| 1,820,265 A | 8/1931 | Bent et al. |
| 2,017,866 A | 10/1935 | Morton et al. |
| 2,051,796 A | 8/1936 | Humphrey |
| 2,108,928 A | 2/1938 | Rummselburg et al. |
| 2,239,555 A | 4/1941 | Fleck et al. |
| 2,369,125 A | 2/1945 | Anderson |
| 2,729,660 A | 1/1956 | Harrison |
| 2,749,614 A | 6/1956 | Volkel |
| 3,310,575 A | 3/1967 | Spivack |
| 3,423,389 A | 1/1969 | Wheelus |
| 3,780,013 A | 12/1973 | Smith |
| 3,959,410 A | 5/1976 | DiRossi |
| 4,172,070 A | 10/1979 | Scharrer et al. |
| 4,283,317 A | 8/1981 | Murphy et al. |
| 4,302,371 A | 11/1981 | Matsuo et al. |
| 4,377,510 A | 3/1983 | Ruckel et al. |
| 4,380,513 A | 4/1983 | Ruckel et al. |
| 4,548,746 A | 10/1985 | Duncan et al. |
| 4,585,584 A | 4/1986 | Johnson, Jr. et al. |
| 4,657,703 A | 4/1987 | Durkee |
| 4,690,783 A | 9/1987 | Johnson, Jr. |
| 4,693,847 A | 9/1987 | Johnson, Jr. |
| 4,725,384 A | 2/1988 | Du Vernet |
| 4,744,925 A | 5/1988 | Lampo et al. |
| 4,758,379 A | 7/1988 | Johnson, Jr. |
| 4,788,009 A | 11/1988 | Johnson, Jr. |
| 4,847,010 A | 7/1989 | Maeda et al. |
| 5,021,548 A | 6/1991 | Minn |
| 5,036,129 A | 7/1991 | Atwell et al. |

(Continued)

FOREIGN PATENT DOCUMENTS

| | | |
|---|---|---|
| CN | 101787249 A | 7/2010 |
| CN | 102002321 A | 4/2011 |

(Continued)

OTHER PUBLICATIONS

International Search Report and Written Opinion dated Jun. 2, 2015, as issued in PCT Application No. PCT/US2014/057674 filed Sep. 26, 2014.
International Search Report and Written Opinion dated Jun. 2, 2015, as issued in PCT Application No. PCT/US2014/057685 filed Sep. 26, 2014.
Allen S. Norman, Aspects of the Thermal Oxidation, Yellowing and Stablisation of Ethylene Vinyl Acetate Copolymer. May 26, 2000. Polymer Degradation and Stability 71 (2001) 1-14.

(Continued)

*Primary Examiner* — Robert Harlan
(74) *Attorney, Agent, or Firm* — Ekatherina Serysheva

(57) ABSTRACT

Disclosed are compositions which include an ethylene polymer derived from at least one polar monomer with one or more ester groups, which polymerize with ethylene, (e.g., a copolymer derived from ethylene and vinyl acetate or a copolymer derived from ethylene and n-butyl acrylate) and a rosin ester. The rosin ester can have a low hydroxyl number (e.g., a hydroxyl number six or five or less), a low acid number (e.g., an acid number of ten or less), a low PAN number (e.g., a PAN number of eight or less), or combinations thereof. The compositions can exhibit improved viscosity stability and/or color stability and/or a decreased amount of char particle formation upon thermal aging.

6 Claims, No Drawings

(56) References Cited

U.S. PATENT DOCUMENTS

| | | |
|---|---|---|
| 5,049,652 A | 9/1991 | Minn |
| 5,504,152 A | 4/1996 | Schluenz et al. |
| 5,543,110 A | 8/1996 | Starr et al. |
| 6,989,413 B2 | 1/2006 | Hazen et al. |
| 2009/0042040 A1* | 2/2009 | Paul ................... C08F 283/00 428/429 |
| 2011/0034669 A1* | 2/2011 | Dallavia ................ C08L 93/04 530/216 |
| 2011/0213120 A1* | 9/2011 | Astrologes ............. C08L 93/04 530/218 |

FOREIGN PATENT DOCUMENTS

| | | |
|---|---|---|
| EP | 2749614 | 7/2014 |
| EP | 2824154 A1 | 1/2015 |
| JP | 7-11194 | 1/1995 |
| JP | 2009-84421 | 4/2009 |
| JP | 2009-161573 | 7/2009 |
| WO | 2004/016705 A2 | 2/2004 |
| WO | 2012/141675 A1 | 10/2012 |
| WO | 2013/133407 A1 | 9/2013 |

OTHER PUBLICATIONS

Rimez B., The Thermal Degradation of Poly (vinyl acetate) and Poly (ethylene-co-vinyl acetate), Part I: Experimental Study of the Degradation Mechanism. Sep. 9, 2007. Polymer Degradation and Stability 93 (2008) 800-810.

Steenwijk Johan, The Effect of (natural) Polyols on the Initial Colour of Heavy Metal-and Zinc-Free Poly (vinyl chloride). May 12, 2005. Polymer Degradation and Stability 91 (2006) 2233-2240.

CABOT: "Norit AZO", Cabot Technical Data Sheets, Jul. 17, 2007, XP002735930.

International Search Report and Written Opinion dated Jun. 2, 2015, as issued in PCT Application No. PCT/US2014/057691 filed Sep. 26, 2014.

* cited by examiner

COMPOSITIONS CONTAINING ETHYLENE POLYMERS

TECHNICAL FIELD

This application relates generally to compositions comprising ethylene polymers derived from at least one polar monomer with one or more ester groups, which polymerize with ethylene, as well as methods of making and using thereof.

BACKGROUND

Ethylene polymers derived from at least one polar monomer with one or more ester groups, which polymerize with ethylene (e.g., polymers derived from vinyl acetate or other vinyl esters of monocarboxylic acids such as poly(ethylene-co-vinyl acetate) (EVA) or copolymers derived from ethylene and an acrylate ester or methacrylate ester such as ethylene n-butyl acrylate (EnBA)), are used in a wide range of applications. For example, EVA is commonly employed in hot-melt adhesives for use in papers and packaging, in conjunction with non-woven materials, in adhesive tapes, in electrical and electronic bonding, in general wood assembly, and in other industrial assembly. EnBA is used in various hot melt adhesive applications, including low application temperature hot melt adhesives. EnBA has a relatively low glass transition temperature $T_g$ as compared to EVA. EnBA based hot melt adhesives can offer higher adhesion even to difficult substrates, better thermal resistance, increased adhesion to metals and glass, and can offer beneficial low temperature use properties.

EVA and ethylene—acrylic ester based thermoreactivable films are a very efficient way to bond various substrates using continuous or discontinuous processes including calandering, press or injection. This technology is widely used to bond fabrics to foams or fabric to fabric in many applications such as automotive or furniture.

In many cases, for example when used in hot-melt adhesive formulations, ethylene polymers derived from at least one polar monomer with one or more ester groups, which polymerize with ethylene are processed at elevated temperatures. In these applications, it is important that the polymers exhibit viscosity stability at elevated processing temperatures. For example, in the case of hot-melt adhesive formulations, changes in the viscosity of the adhesive upon incubation at an elevated processing temperature can affect the quantity of adhesive applied to the substrate over time. This inconsistency can jeopardize the quality of an adhesive bond or joint formed using the hot-melt adhesive. In addition, an increase in hot melt adhesive viscosity can be associated with gelling and can contribute to char particle formation in the hot melt adhesive formulation. Char particle formation in the hot melt adhesive formulation can negatively impact hot melt adhesive clean running properties. This can lead to hot melt equipment nozzle obstruction or can aggravate such an obstruction which can increase hot melt equipment downtime. Unfortunately, ethylene copolymers which are copolymers with one or more polar monomers which contain an ester group and which polar monomers can polymerize with ethylene, such as EVA or EnBA, can exhibit limited viscosity stability at elevated temperatures such as in the case of hot-melt adhesive formulations. Without being bound to any theory, ethylene polymers derived from at least one polar monomer with one or more ester groups, which polymerize with ethylene can be thermally unstable such as in the case of hot-melt adhesive formulations. At elevated temperatures, they can degrade, leading to crosslinking of the copolymer and an increase in viscosity. By stabilizing the viscosity of ethylene polymers derived from at least one polar monomer with one or more ester groups, which polymerize with ethylene (e.g., copolymers derived from ethylene and vinyl acetate or n-butyl acrylate) at elevated temperatures in hot-melt adhesive formulations, the processing of such materials can be greatly improved.

SUMMARY

Provided herein are compositions that include ethylene polymers derived from at least one polar monomer with one or more ester groups, which polymerize with ethylene, and a rosin ester. Ethylene polymers derived from at least one polar monomer with one or more ester groups, which polymerize with ethylene include copolymers derived, at least in part, from polymerization of vinyl alkanoate monomers or acrylate ester monomers or methacrylate ester monomers with ethylene. Examples of vinyl alkanoate monomers include vinyl acetate, vinyl propionate, and vinyl laurate and other vinyl esters of monocarboxylic acids. For example, the copolymer derived from a vinyl alkanoate can be a copolymer of vinyl acetate with ethylene s (i.e., poly(ethylene-co-vinyl acetate), EVA). Examples of acrylate ester monomers or methacrylate ester monomers with ethylene include, but are not limited to, acrylic acid derived esters with methanol, ethanol, propanol, butanol or other alcohols, or methacrylic ester derived esters with methanol, ethanol, butanol or other alcohols. Examples of acrylate or methacrylate derived monomers include but are not limited to n-butyl acrylate, methyl acrylate, ethyl acrylate, 2-ethyl hexyl acrylate, methyl methacrylate, and ethyl methacrylate. Random and block copolymers, as well as blends thereof may be used in the practice of the invention. Ethylene—Acrylic esters—Maleic Anhydride derived terpolymers or Ethylene—Vinyl Acetate—Maleic Anhydride derived terpolymers or ethylene acrylic ester terpolymers based or acrylic esters, ethylene and glycidyl methacrylate may be used in the practice of the invention.

The rosin ester can have a low hydroxyl number (e.g., a hydroxyl number six, five or less), a low acid number (e.g., an acid number of ten or less), a low PAN number (e.g., a PAN number of eight or less), or combinations thereof. The rosin ester can be derived from tall oil rosin, gum rosin, wood rosin, or a combination thereof. In certain embodiments, the rosin ester has a Gardner color of four or less. Blends of more than one rosin ester may be used in the practice of the invention. Blends of one or more rosin esters with other resins which are known as tackifiers in the adhesives industry may be used in the practice of the invention.

In certain embodiments, the composition is a hot-melt adhesive, such as an EVA-based hot-melt adhesive. The ethylene polymers derived from at least one polar monomer with one or more ester groups, which polymerize with ethylene (e.g., a polymer derived from ethylene and vinyl acetate or a polymer derived from ethylene and n-butyl acrylate) can be from 20% by weight to 60% by weight of the hot-melt adhesive composition (e.g., from 30% by weight to 40% by weight of the hot-melt adhesive composition), and the rosin ester can be from 20% by weight to 50% by weight of the hot-melt adhesive composition (e.g., from 30% by weight to 40% by weight of the hot-melt adhesive composition). The hot-melt adhesive can further include one or more additional components, including additional tackifiers, waxes, stabilizers (e.g., antioxidants), and fillers. In some embodiments, the hot-melt adhesive further comprises a wax. In certain embodiments, the composition is a hot-melt adhesive and the polymer derived from a vinyl alkanoate is EVA, such as EVA derived from 10% by weight to 40% by weight vinyl acetate (e.g., from 17% by weight to 34% by weight vinyl acetate). The compositions can exhibit improved viscosity stability on aging at elevated temperatures (thermal aging). For example, in some embodiments, the compositions exhibit less than a 10% change in viscosity upon incubation at 177° C. for 96 hours (e.g., less than a 7.5% change in viscosity, less than a 5% change in viscosity, less than a 1% change in viscosity, or substantially no change in viscosity). The compositions can also exhibit improved color stability upon thermal aging. In some embodiments, the composition has a Gardner color of ten or less after incubation at 177° C. for 96 hours (e.g., eight or less, or five or less). In some embodiments, the composition exhibits less than 30% char formation upon incubation at 177° C. for 9 days, less than 20% char formation upon incubation at 177° C. for 9 days, less than 15% char formation upon incubation at 177° C. for 9 days, or even less than 10% char formation upon incubation at 177° C. for 9 days.

Also provided are methods for preparing polymer compositions, including hot-melt adhesives. Methods for preparing polymer compositions can include mixing ethylene polymers derived from at least one polar monomer with one or more ester groups, which polymerize with ethylene and one or more rosin esters having a hydroxyl number of six, five or less. Methods can further include adding one or more additional components to the composition, such as one or more additional tackifiers or resins, one or more waxes, a stabilizer (e.g., one or more antioxidants), one of more fillers, or a combination thereof. Methods can further include esterifying a rosin to obtain a rosin ester having a hydroxyl number of six, five or less, which can then be mixed with the copolymer.

DETAILED DESCRIPTION

Provided herein are compositions that include ethylene polymers derived from at least one polar monomer with one or more ester groups, which polymerize with ethylene or a blend of two or more of such polymers, and a rosin ester.

The ester group in the polar monomers of this invention can be either covalently linked with its alkoxy moiety to the vinyl part of the monomer such as is the case in vinyl alkanoates as exemplified by vinyl acetate, or can be linked with its acyl carbon atom to the vinyl part of the monomer such as is the case in an acrylate ester or methacrylate ester as exemplified by n-butyl acrylate.

By incorporating a rosin ester having particular properties (e.g., a low hydroxyl number, a low acid number, a low PAN number, or combinations thereof) into ethylene polymers derived from at least one polar monomer with one or more ester groups, which polymerize with ethylene the resultant composition can exhibit improved viscosity stability on aging at elevated temperatures (thermal aging). By incorporating a rosin ester having particular properties (e.g., a low hydroxyl number, a low acid number, a low PAN number, or combinations thereof) into ethylene polymers derived from at least one polar monomer with one or more ester groups, which polymerize with ethylene, the resultant composition can exhibit a lower amount of char particle formation on aging at elevated temperatures (thermal aging). In some embodiments, the rosin ester includes more than one type of rosin ester. In some embodiments, the rosin ester can be blended with other resins which are known as tackifiers in the adhesives industry.

Copolymers derived from ethylene and vinyl alkanoates include polymers derived, from polymerization of one or more vinyl alkanoate monomers with ethylene. For example, a copolymer derived from ethylene and a vinyl alkanoate can be obtained by, for example, radical polymerization of a monomer mixture comprising one or more vinyl alkanoate monomers and ethylene. Said another way, a copolymer derived from ethylene and a vinyl alkanoate can be said to contain monomer units obtained by copolymerization (e.g., radical polymerization) of one or more vinyl alkanoate monomers (e.g., vinyl alkanoate monomer units) with ethylene, such as is the case in poly(ethylene-co-vinyl acetate), EVA. In these embodiments, the co-polymer derived from ethylene and one or more vinyl alkanoates can be derived from a monomer mixture comprising varying amounts of vinyl alkanoates and ethylene, so as to provide a copolymer having the chemical and physical properties suitable for a particular application.

Vinyl alkanoate monomers are composed of a vinyl moiety which is covalently bound with a single bond to the oxygen atom of an alkylcarbonyloxy group or a formyloxy group. Alkylcarbonyloxy group are generally also referred to as alkanoyloxy groups. The alkyl moiety of this alkylcarbonyloxy group as used herein, refers to the radical of saturated or unsaturated aliphatic groups, including straight-chain alkyl, alkenyl, or alkynyl groups, branched-chain alkyl, alkenyl, or alkynyl groups, cycloalkyl or cycloalkenyl (alicyclic) groups, alkyl-substituted cycloalkyl or cycloalkenyl groups, cycloalkyl-substituted alkyl or alkenyl groups, arylalkyl groups, or cinnamyl groups. In some embodiments, the alkyl group comprises 30 or fewer carbon atoms in its backbone (e.g., C1-C30 for straight chain, C3-C30 for branched chain). For example, the alkyl group can comprise 20 or fewer carbon atoms, 12 or fewer carbon atoms, 8 or fewer carbon atoms, or 6 or fewer carbon atoms in its backbone. Representative of alkyl groups are methyl, ethyl, propyl, isopropyl, butyl, isobutyl, sec-butyl, tert-butyl, pentyl, isopentyl, neopentyl, hexyl, heptyl, octyl, ethylhexyl, nonyl, decyl, undecyl, dodecyl, tridecyl, tetradecyl, pentadecyl, hexadecyl, heptadecyl, octadecyl, and the like. The term alkyl includes both unsubstituted alkyls and substituted alkyls, the latter of which refers to alkyl groups having one or more substituents, such as a halogen (F or Cl), haloalkyl (e.g., $-CF_3$ or $CCl_3$), replacing a hydrogen on one or more carbons of the hydrocarbon backbone. The alkyl groups can also comprise one or two oxygen atoms within the carbon backbone of the alkyl group, such as an ether moiety. Arylalkyl, as used herein, refers to an alkyl group substituted with an aryl group (e.g., derived from an aromatic hydrocarbon such as a phenyl group or benzyl group). A cinnamyl group, as used herein, refers to an allylic group with an attached phenyl substituent at the 3-position. Suitable vinyl alkanoate monomers include vinyl formate, vinyl acetate, vinyl propionate, vinyl butyrate, vinyl isobutyrate, vinyl valerate, vinyl isovalerate, vinyl caproate, vinyl isocaproate, vinyl 2-ethyl hexanoate, vinyl isooctanoate, vinyl nonanoate, vinyl decanoate, vinyl laurate, vinyl pivalate, vinyl palmitate, vinyl stearate, vinyl cinnamate and vinyl versatate. In some embodiments, the vinyl alkanoate monomer comprises a monomer selected from the group consisting of vinyl acetate, vinyl propionate, vinyl laurate, and combinations thereof. In certain embodiments, the vinyl alkanoate monomer comprises vinyl acetate.

In some embodiments, the copolymer derived from ethylene and a vinyl alkanoate (e.g., vinyl acetate) is derived from at least 5% by weight of a vinyl alkanoate monomer (e.g., vinyl acetate), based on the total weight of all of the monomers polymerized to form the polymer (e.g., at least 7.5% by weight, at least 9% by weight, at least 10% by weight, at least 11% by weight, at least 12% by weight, at least 13% by weight, at least 14% by weight, at least 15% by weight, at least 16% by weight, at least 17% by weight, at least 18% by weight, at least 19% by weight, at least 20% by weight, at least 21% by weight, at least 22% by weight, at least 23% by weight, at least 24% by weight, at least 25% by weight, at least 26% by weight, at least 27% by weight, at least 28% by weight, at least 29% by weight, at least 30% by weight, at least 31% by weight, at least 32% by weight, at least 33% by weight, at least 34% by weight, at least 35% by weight, at least 37.5% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight, to a maximum of 95% by weight). In some embodiments, the polymer derived from ethylene and a vinyl alkanoate is derived from 95% by weight or less of a vinyl alkanoate monomer (e.g., vinyl acetate), based on the total weight of all of the monomers polymerized to form the polymer (e.g., 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 37.5% by weight or less, 35% by weight or less, 34% by weight or less, 33% by weight or less, 32% by weight or less, 31% by weight or less, 30% by weight or less, 29% by weight or less, 28% by weight or less, 27% by weight or less, 26% by weight or less, 25% by weight or less, 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, or 7.5% by weight or less, to a minimum of 5% by weight).

The copolymer derived from ethylene and a vinyl alkanoate (e.g. vinyl acetate) can be a copolymer derived from an amount of a vinyl alkanoate (e.g., vinyl acetate) ranging from any of the minimum values above to any of the maximum values above. For example, the polymer derived from ethylene and a vinyl alkanoate (e.g., vinyl acetate) can be a copolymer derived from 5% by weight to less than 95% by weight of a vinyl alkanoate monomer (e.g., vinyl acetate), based on the total weight of all of the monomers polymerized to form the polymer (e.g., from 5% by weight to 75% by weight of a vinyl alkanoate monomer such as vinyl acetate, from 10% by weight to 40% by weight of a vinyl alkanoate monomer such as vinyl acetate, or from 17% by weight to 34% by weight of a vinyl alkanoate monomer such as vinyl acetate).

In the case of terpolymers derived from ethylene and a vinyl alkanoate monomer (e.g., vinyl acetate) and one or more ethylenically-unsaturated monomers, any suitable ethylenically-unsaturated monomers can be incorporated in the terpolymer, so as to provide a terpolymer having the chemical and physical properties desired for a particular application. By way of example, suitable ethylenically-unsaturated monomers which can be incorporated into the terpolymers include (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof. As used herein, the term "(meth)acrylate monomer" includes acrylate, methacrylate, diacrylate, and dimethacrylate monomers. Similarly, the term "(meth)acrylonitrile" includes acrylonitrile, methacrylonitrile, etc. and the term "(meth)acrylamide" includes acrylamide, methacrylamide, etc.

Suitable (meth)acrylate monomer include esters of α,β-monoethylenically unsaturated monocarboxylic and dicarboxylic acids having 3 to 6 carbon atoms with alkanols having 1 to 20 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary (meth)acrylate monomers include, but are not limited to, methyl acrylate, methyl(meth)acrylate, ethyl acrylate, ethyl (meth)acrylate, butyl acrylate, butyl(meth)acrylate, isobutyl (meth)acrylate, n-hexyl(meth)acrylate, ethylhexyl(meth)acrylate, n-heptyl(meth)acrylate, ethyl(meth)acrylate, 2-methylheptyl(meth)acrylate, octyl(meth)acrylate, isooctyl (meth)acrylate, n-nonyl(meth)acrylate, isononyl(meth)acrylate, n-decyl(meth)acrylate, isodecyl(meth)acrylate, dodecyl (meth)acrylate, lauryl(meth)acrylate, tridecyl(meth) acrylate, stearyl(meth)acrylate, glycidyl(meth)acrylate, alkyl crotonates, vinyl acetate, di-n-butyl maleate, di-octylmaleate, acetoacetoxyethyl(meth)acrylate, acetoacetoxypropyl(meth)acrylate, hydroxyethyl(meth)acrylate, allyl(meth) acrylate, tetrahydrofurfuryl(meth)acrylate, cyclohexyl (meth)acrylate, 2-ethoxyethyl(meth)acrylate, 2-methoxy (meth)acrylate, 2-(2-ethoxyethoxy)ethyl(meth)acrylate, 2-ethylhexyl(meth)acrylate, 2-propylheptyl(meth)acrylate, 2-phenoxyethyl(meth)acrylate, isobornyl(meth)acrylate, caprolactone(meth)acrylate, polypropyleneglycol mono (meth)acrylate, polyethyleneglycol(meth)acrylate, benzyl (meth)acrylate, 2,3-di(acetoacetoxy)propyl(meth)acrylate, hydroxypropyl(meth)acrylate, methylpolyglycol(meth)acrylate, 3,4-epoxycyclohexylmethyl(meth)acrylate, 1,6 hexanediol di(meth)acrylate, 1,4 butanediol di(meth)acrylate and combinations thereof.

Suitable vinyl aromatic compounds include styrene, α- and p-methylstyrene, α-butylstyrene, 4-n-butylstyrene, 4-n-decylstyrene, vinyltoluene, and combinations thereof. Suitable vinyl esters of carboxylic acids include vinyl esters of carboxylic acids comprising up to 20 carbon atoms, such as vinyl laurate, vinyl stearate, vinyl propionate, versatic acid vinyl esters, and combinations thereof. Suitable vinyl halides can include ethylenically unsaturated compounds substituted by chlorine, fluorine or bromine, such as vinyl chloride and vinylidene chloride. Suitable vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 2 to 8 carbon atoms and one olefinic double bond, such as ethylene, as well as hydrocarbons having 4 to 8 carbon atoms and two olefinic double bonds, such as butadiene, isoprene, and chloroprene.

In some embodiments, the copolymer derived from ethylene and a vinyl alkanoate can be a copolymer derived from vinyl acetate. In certain embodiments, the copolymer derived from ethylene and vinyl acetate is poly(ethylene-co-vinyl acetate) (EVA). EVA is a copolymer derived from ethylene and vinyl acetate. EVA is widely used in a variety of applications, including as a copolymer in hot-melt adhesives, in road marking and pavement marking applications, in biomedical applications (e.g., as a matrix for controlled drug delivery), as an additive in plastic films, and as a foam in a variety of consumer products.

Optionally, the EVA copolymer can be grafted with suitable olefinic monomers, such as butadiene, to obtain copolymers having the particular chemical and physical properties required for a particular application. See, for example, U.S. Pat. No. 3,959,410 to DiRossi and U.S. Pat. No. 5,036,129 to Atwell, et al.

In certain embodiments, the polymer derived from vinyl acetate is EVA derived from 9% by weight to less than 45% by weight vinyl acetate, based on the total weight of all of the monomers polymerized to form the polymer (e.g., from 17% by weight to 40% by weight vinyl acetate, from 17% by weight to 34% by weight vinyl acetate, or from 25% by weight to 30% by weight vinyl acetate). In one embodiment, the polymer derived from vinyl acetate is EVA derived from 28% by weight vinyl acetate, based on the total weight of all of the monomers polymerized to form the polymer. An example of such an EVA copolymer is EVATANE® 28-420 EVA (EVA copolymer with a 27-29 wt % vinyl acetate content, commercially available from Arkema Inc.)

In some embodiments, the copolymer derived from ethylene and a vinyl alkanoate (e.g., vinyl acetate) has a melting temperature, as measured by differential scanning calorimetry (DSC) using the standard method described in ISO 11357-3:2011, of greater than 25° C. (e.g., greater than 30° C., greater than 35° C., greater than 40° C., greater than 45° C., greater than 50° C., greater than 55° C., greater than 60° C., greater than 65° C., greater than 70° C., greater than 75° C., greater than 80° C., greater than 85° C., greater than 90° C., or greater than 95° C.). The copolymer derived from ethylene and a vinyl alkanoate (e.g., vinyl acetate) can have a melting temperature of less than 100° C. (e.g., less than 95° C., less than 90° C., less than 85° C., less than 80° C., less than 75° C., less than 70° C., less than 65° C., less than 60° C., less than 55° C., less than 50° C., less than 45° C., less than 40° C., less than 35° C., or less than 30° C.).

The copolymer derived from ethylene and a vinyl alkanoate (e.g., vinyl acetate) can have a melting temperature ranging from any of the minimum values above to any of the maximum values above. For example, the polymer derived from a vinyl alkanoate (e.g., vinyl acetate) can have a melting temperature, as measured by differential scanning calorimetry (DSC) using the standard method described in ISO 11357-3:2011, of from 25° C. to 100° C. (e.g., from 25° C. to 90° C., from 35° C. to 85° C., or 50° C. to 80° C.).

Polymers derived from ethylene and an acrylate ester or methacrylate ester include those obtained from polymerization of one or more acrylate ester or methacrylate ester monomers with ethylene. For example, a copolymer derived from ethylene and an acrylate ester or methacrylate ester can be obtained by, for example, radical polymerization of a monomer mixture comprising one or more acrylate ester or methacrylate ester monomers and ethylene. Said another way, a copolymer derived from ethylene and an acrylate ester or methacrylate ester can be said to contain monomer units obtained by copolymerization (e.g., radical polymerization) of one or more acrylate ester or methacrylate ester monomers (e.g., n-butyl acrylate monomer units) with ethylene, such as is the case in ethylene-n-butyl acrylate copolymer, EnBA.

Exemplary acrylate ester or methacrylate ester monomers include but are not limited, to acrylate esters with methanol, ethanol, propanol, butanol or other alcohols, or methacrylate esters with methanol, ethanol, propanol, butanol or other alcohols. Examples of acrylate or methacrylate derived monomers include but are not limited to n-butylacrylate, methylacrylate, ethylacrylate, 2-ethyl hexyl acrylate, methyl methacrylate, and ethylmethacrylate. Random copolymers, block copolymers, terpolymers and grafted polymers as well as blends thereof may be used in the practice of the invention. Compatible blends of homopolymers with the copolymers or terpolymers of this invention may be used in the practice of the invention.

In some embodiments, the polymer derived from ethylene and an acrylate ester or methacrylate ester (e.g., n-butyl acrylate) is derived from at least 5% by weight of an acrylate ester or methacrylate ester monomer (e.g., n-butyl acrylate), based on the total weight of all of the monomers polymerized to form the polymer (e.g., at least 7.5% by weight, at least 9% by weight, at least 10% by weight, at least 11% by weight, at least 12% by weight, at least 13% by weight, at least 14% by weight, at least 15% by weight, at least 16% by weight, at least 17% by weight, at least 18% by weight, at least 19% by weight, at least 20% by weight, at least 21% by weight, at least 22% by weight, at least 23% by weight, at least 24% by weight, at least 25% by weight, at least 26% by weight, at least 27% by weight, at least 28% by weight, at least 29% by weight, at least 30% by weight, at least 31% by weight, at least 32% by weight, at least 33% by weight, at least 34% by weight, at least 35% by weight, at least 37.5% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight, to a maximum of 95% by weight). In some embodiments, the polymer derived from ethylene and acrylate ester or methacrylate ester monomer (e.g., n-butyl acrylate) is derived from 95% by weight or less of a acrylate ester or methacrylate ester monomer (e.g., n-butyl acrylate), based on the total weight of all of the monomers polymerized to form the polymer (e.g., 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 37.5% by weight or less, 35% by weight or less, 34% by weight or less, 33% by weight or less, 32% by weight or less, 31% by weight or less, 30% by weight or less, 29% by weight or less, 28% by weight or less, 27% by weight or less, 26% by weight or less, 25% by weight or less, 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, or 7.5% by weight or less, to a minimum of 5% by weight).

The copolymer derived from ethylene and an acrylate ester or methacrylate ester monomer (e.g., n-butyl acrylate) can be a copolymer derived from an amount of an acrylate ester or methacrylate ester monomer (e.g., n-butyl acrylate) ranging from any of the minimum values above to any of the maximum values above. For example, the polymer derived from ethylene and an acrylate ester or methacrylate ester monomer (e.g., n-butyl acrylate) can be a copolymer derived from 5% by weight to less than 95% by weight of an acrylate ester or methacrylate ester monomer (e.g., n-butyl acrylate), based on the total weight of all of the monomers polymerized to form the polymer (e.g., from 5% by weight to 75% by weight of an acrylate ester or methacrylate ester monomer such as n-butyl acrylate, from 10% by weight to 50% by weight of an acrylate ester or methacrylate ester monomer such as n-butyl acrylate, or from 30% by weight to 45% by weight of an acrylate ester or methacrylate ester monomer such as n-butyl acrylate.

In some embodiments, the copolymer derived from ethylene and an acrylate ester or methacrylate ester monomer can be a copolymer derived from n-butyl acrylate. In certain embodiments, the copolymer derived from ethylene and an acrylate ester or methacrylate ester monomer is ethylene n-butyl acrylate) (EnBA). EnBA is a copolymer derived from ethylene and n-butyl acrylate. EnBA is widely used in a variety of applications, including as a copolymer in hot-melt adhesives, in a variety of consumer products. Optionally, the EnBA copolymer can be grafted with suitable olefinic monomers, to obtain terpolymers having the particular chemical and physical properties required for a particular application.

In certain embodiments, the copolymer derived from ethylene and n-butyl acrylate is EnBA derived from 5% by weight to less than 75% by weight n-butyl acrylate, based on the total weight of all of the monomers polymerized to form the polymer (e.g., from 10% by weight to 50% by weight n-butyl acrylate, from 30% by weight to 45% by weight, or from 33% by weight to 37% by weight n-butyl acrylate). In one embodiment, the polymer derived from vinyl acetate is EnBA derived from approximately 35% by weight n-butyl acrylate, based on the total weight of all of the monomers polymerized to form the polymer. An example of such an EnBA copolymer is LOTRYL® 35BA320 (EnBA copolymer with a 33-37 wt % n-butyl acrylate content, commercially available from Arkema Inc.).

The compositions provided herein also include a rosin ester. Rosin esters can be formed by the esterification of rosin. Rosin, also called colophony or Greek pitch (*Pix graeca*), is a solid hydrocarbon secretion of plants, typically of conifers such as pines (e.g., *Pinus palustris* and *Pinus caribaea*). Rosin can include a mixture of rosin acids, with the precise composition of the rosin varying depending in part on the plant species. Rosin acids are $C_{20}$ fused-ring monocarboxylic acids with a nucleus of three fused six-carbon rings containing double bonds that vary in number and location. Examples of rosin acids include abietic acid, neoabietic acid, dehydroabietic acid, dihydroabietic acid, pimaric acid, levopimaric acid, sandaracopimaric acid, isopimaric acid, and palustric acid. Natural rosin typically consists of a mixture of seven or eight rosin acids, in combination with minor amounts of other components.

Rosin is commercially available, and can be obtained from pine trees by distillation of oleoresin (gum rosin being the residue of distillation), by extraction of pine stumps (wood rosin) or by fractionation of tall oil (tall oil rosin). Any type of rosin can be used to prepare the rosin esters described herein, including tall oil rosin, gum rosin and wood rosin and mixtures thereof. In certain embodiments, the rosin ester is derived from tall oil rosin. Examples of commercially available rosins include tall oil rosins such as SYLVAROS® 85, SYLVAROS® 90, and SYLVAROS® NCY, commercially available from Arizona Chemical Company, LLC. Gum rosins can originate from a variety of *Pinus* species such as *Pinus elliottii, Pinus merkusii,* and *Pinus massoniana*.

Rosins can be used as a feedstock for the formation of rosin esters as obtained from a commercial or natural source. Alternatively, rosin can be subjected to one or more purification steps (e.g., distillation under reduced pressure, extraction, and/or crystallization) prior its use as a feedstock for the formation of rosin esters. If desired, one or more purified rosin acids (e.g., abietic acid, neoabietic acid, pimaric acid, levopimaric acid, sandaracopimaric acid, isopimaric acid, palustric acid, dehydroabietic acid, dihydroabietic acid, or combinations thereof) can be used as a feedstock for the formation of a rosin ester in place of rosin.

Rosin esters can be obtained from rosin and suitable alcohols using a variety of methods known in the art. See, for example, U.S. Pat. No. 5,504,152 to Douglas et al., which is hereby incorporated by reference in its entirety. Suitable methods for preparing the rosin esters can be selected in view of the desired chemical and physical properties of the resultant rosin esters.

Methods for esterifying rosin can include contacting the rosin with an alcohol, and allowing the rosin and the alcohol to react for a period of time and under suitable conditions to form a rosin ester. For example, rosin can be esterified by a thermal reaction of the rosin with an alcohol. Esterification can comprise contacting the rosin with the alcohol at an elevated temperature (e.g., at a temperature from greater than greater than 30° C. to 250° C.). In some such embodiments, methods can involve contacting molten rosin with an alcohol for a period of time suitable to form a rosin ester.

The amount of alcohol employed in the esterification process relative to the amount of rosin can be varied, depending on the nature of the alcohol and the desired chemical and physical properties of the resultant rosin ester. In some embodiments, the rosin is provided in excess so as to produce a rosin ester having a low hydroxyl number. For example, the alcohol can be provided in an amount such that less than a molar equivalent of hydroxy groups is present in the reaction relative to the amount of rosin present.

Any suitable alcohol, include monoalcohols, diols, and other polyols, can be used to form the rosin esters. Examples of suitable alcohols include glycerol, pentaerythritol, dipentaerythritol, ethylene glycol, diethylene glycol, triethylene glycol, sorbitol, neopentylglycol, trimethylolpropane, methanol, ethanol, propanol, butanol, amyl alcohol, 2-ethyl hexanol, diglycerol, tripentaerythritol, $C_8$-$C_{11}$ branched or unbranched alkyl alcohols, and $C_7$-$C_{16}$ branched or unbranched arylalkylalcohols. In certain embodiments, the alcohol is a polyhydric alcohol. For example, the polydric alcohol can be selected from the group consisting of ethylene glycol, propylene glycol, diethylene glycol, triethylene glycol, tetraethylene glycol, trimethylene glycol, glycerol, trimethylolpropane, trimethylolethane, pentaerythritol, mannitol, and combinations thereof. In some embodiments, more than one alcohol is used to form the rosin esters. In certain embodiments, pentaerythritol and one or more additional alcohols selected from the group consisting of glycerol, dipentaerythritol, ethylene glycol, diethylene glycol, triethylene glycol, trimethylolpropane, and combinations thereof are used to form the rosin esters.

In some embodiments, the rosin is reacted with an alcohol and with an amount of more than zero up to 10 weight %, by weight of all reactants, of a carboxylic acid functional organic compound selected from the group consisting of aromatic monofunctional carboxylic acids, aromatic difunctional carboxylic acids, aromatic polyfunctional carboxylic acids, aliphatic monofunctional carboxylic acids, unsaturated linear or branched monofunctional carboxylic acids, aliphatic difunctional carboxylic acids, unsaturated linear or branched difunctional carboxylic acids, aliphatic polyfunctional carboxylic acids, cycloaliphatic monofunctional carboxylic acids, cycloaliphatic difunctional carboxylic acids, cycloaliphatic polyfunctional carboxylic acids, natural fatty acids, synthetic fatty acids, fatty acids derived from triglyceride vegetable oils, and combinations thereof. See for example, U.S. patent 2011/0034669 to Dallavia which is incorporated herein by reference in its entirety. Examples of aliphatic monofunctional acids are formic acid, acetic acid, propionic acid, butyric acid, valeric acid, caproic acid, enanthic acid, caprylic acid, pelargonic acid, capric acid, lauric acid, myristic acid, palmitic acid, stearic acid, arachidic acid, behenic, and cerotic acid. Examples of aliphatic difunctional carboxylic acids are oxalic acid, malonic acid, succinic acid, glutaric acid, adipic acid, pimelic acid, suberic acid, azelaic acid, sebacic acid, undecanedioic acid, and dodecanedioic acid. Examples of cycloaliphatic difunctional carboxylic acids are 1,2-cyclohexanedicarboxylic acid, 1,3-cyclohexanedicarboxylic acid, and 1,4-cyclohexanedicarboxylic acid. An example of an aromatic monofunctional carboxylic acid is benzoic acid. Examples of cycloaliphatic monofunctional carboxylic acids are cyclopropanecarboxylic acid, cyclopentanecarboxylic acid and cyclohexanecarboxylic acid. Examples of aromatic difunctional carboxylic acids are phthalic acid, isophthalic acid, terephthalic acid, and 2-(2-carboxyphenyl)benzoic acid. Examples of unsaturated linear or branched monofunctional carboxylic acids are acrylic acid, methacrylic acid, crotonic acid, 3,3-dimethylacrylic acid, linoleic acid, alpha-linolenic acid, elaidic acid, sapienic acid, arachidonic acid, myristoleic acid, palmitoleic acid, and oleic acid. Examples of fatty acids derived from triglyceride vegetable oils, such as palm oil, linseed oil, rapeseed oil, sunflower seed oil, olive oil, tung oil, peanut oil, cottonseed oil, palm kernel oil, and coconut oil, are linoleic acid, alpha-linolenic acid, palmitic acid, stearic acid, myristic acid, and oleic acid. Examples of natural fatty acids are tall oil fatty acid and dimers thereof.

As is known in the art, catalysts, bleaching agents, stabilizers, and/or antioxidants can be added to the esterification reaction. Suitable catalysts, bleaching agents, stabilizers, and antioxidants are known in the art, and described, for example, in U.S. Pat. Nos. 2,729,660, 3,310,575, 3,423,389, 3,780,013, 4,172,070, 4,548,746, 4,690,783, 4,693,847, 4,725,384, 4,744,925, 4,788,009, 5,021,548, and 5,049,652. In order to drive the esterification reaction to completion, water can be removed from the reactor using standard methods, such as distillation and/or application of a vacuum.

Following the esterification reaction, unreacted rosin as well as other volatile components can be removed from the resultant rosin ester product, for example, by steam sparging, sparging by an inert gas such as nitrogen gas, wiped film evaporation, short path evaporation, and vacuum distillation. This results in stripping any excess rosin acid from the rosin ester products, reducing the acid number of the rosin ester. Following esterification, the resultant rosin ester can comprise low amounts of residual, unreacted rosin acid and/or alcohol. A rosin ester which is characterized by a low hydroxyl number and having a low acid number after one of the above mentioned volatiles removal methods can be characterized by a relatively low weight fraction of lower molecular weight species. This property can render it in particular suitable for applications where low migration and/or low volatile organic compounds (VOC) content is beneficial. Examples are food contact applications and low-fogging systems.

To obtain a rosin ester having the desired chemical and physical properties for incorporation into the compositions described herein, preparation of the rosin esters can optionally further include one or more additional processing steps. As described above, the rosin acids (e.g., abietadienoic acids) can include conjugated double bonds within their ring systems. These conjugated double bonds can be a source of oxidative instability. Accordingly, in some embodiments, the rosin to be esterified and/or the rosin ester formed by esterification can be processed to decrease the PAN number of the rosin or rosin ester. The PAN number of rosin or a rosin ester refers to the weight percentage of abietadienoic acids (in particular palustric, abietic and neoabietic acid) present in the rosin or rosin ester, based on the total weight of the rosin or rosin ester. The term "PAN number", as used herein, refers to the sum of the weight percentages of palustric, abietic and neoabietic acid moieties in the rosin or rosin esters, as determined according to method described in ASTM D5974-00 (2010). Methods of reducing the PAN number of rosin or a rosin ester are known in the art, and include hydrogenation, dehydrogenation, disproportionation, dimerization, and fortification. In certain embodiments, rosin is processed using one or more of these methods prior to esterification to improve the chemical and physical properties of the resultant rosin esters. Where chemically permissible, such methods can also be performed in combination with esterification and/or following esterification to obtain a rosin ester having the desired chemical and physical properties, as discussed in more detail below.

The rosin or rosin ester can be fortified to improve the chemical and physical properties of the resultant rosin esters. In some embodiments, rosin is fortified prior to esterification to improve the chemical and physical properties of the resultant rosin esters. Fortification of rosin involves the chemical modification of the conjugated double bond system of the abietadienoic acids in the rosin, so as to provide rosin having a lower PAN number than the starting rosin. A number of suitable chemical modifications and related chemical methods are known in the art to decrease the abietadienoic acid content of rosin and rosin esters, thereby decreasing their PAN number. For example, rosins can be fortified by means of a Diels-Alder or Ene addition reaction of a rosin acid with a dienophile, such as an $\alpha,\beta$-unsaturated organic acid or the anhydride of such an acid. Examples of suitable dienophiles include maleic acid, fumaric acid, acrylic acid, esters derived from these acids, and maleic anhydride.

In some embodiments, the rosin is disproportionated prior to esterification to improve the chemical and physical properties of the resultant rosin esters. Rosin disproportionation converts abietadienoic acid moieties into dehydroabietic acid and dihydroabietic acid moieties. Methods of disproportionation are known in the art, and can involve heating rosin, often in the presence of one or more disproportionation agents. Suitable methods for disproportionating rosin are described in, for example, U.S. Pat. Nos. 3,423,389, 4,302,371, and 4,657,703, all of which are incorporated herein by reference.

A variety of suitable disproportionation agents can be used. Examples of suitable disproportionation agents include thiobisnaphthols, including 2,2'thiobisphenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis(6-t-butyl-o-cresol) thiobisnaphthols, 2,2'-thio-bisphenols, 3,3'-thio-bis phenols; metals, including palladium, nickel, and platinum; iodine or iodides (e.g., iron iodide); sulfides (e.g., iron sulfide); and combinations thereof. In certain embodiments, the rosin is disproportionate using a phenol sulfide type disproportionation agent. Examples of suitable phenol sulfide type disproportionation agents include poly-t-butylphenoldisulfide (commercially available under the trade name ROSINOX® from Arkema, Inc.), 4,4'thiobis(2-t-butyl-5-methylphenol (commercially available under the trade name LOWINOX® TBM-6 from Chemtura), nonylphenol disulfide oligomers (such as those commercially available under the trade name ETHANOX® TM323 from Albemarle Corp.), and amylphenol disulfide polymer (such as those commercially available under the trade name VULTAC® 2 from Sovereign Chemical Co.).

In certain embodiments, the rosin is disproportionated prior to esterification to form the resultant rosin esters. In these embodiments, a disproportionated rosin or partly disproportionated rosin can be used as a feedstock for the esterification methods described below. In some cases, disproportionation or further disproportionation can be conducted during the esterification reaction. For example, disproportionated or partly disproportionated rosin can be generated in situ and esterified thereafter in a one-pot synthesis procedure to a rosin ester. In some embodiments, the rosin is disproportionated prior to esterification, such that the rosin used as a feedstock for esterification. GRESINOX 578 M and GRESINOX 511 are examples of commercially available disproportionated rosins which are marketed by DRT (Dérivés Résiniques et Terpéniques).

If desired, rosin esters can be chemically modified following esterification to provide a rosin ester having a low hydroxyl number. This process can involve chemical modification of residual hydroxyl moieties in the rosin ester following esterification using synthetic methods known in the art. For example, a rosin ester can be reacted with an acylating agent (e.g., a carboxylic acid or a derivative thereof, such as an acid anhydride, like acetic anhydride which is derived from acetic acid). Such acid anhydrides can also be derived from other alkanoic acids such as propionic acid, butyric acid, valeric acid, caproic acid, enanthic acid, caprylic acid, pelargonic acid, capric acid, lauric acid, myristic acid, palmitic acid, stearic acid, or arachidic acid. See, for example, U.S. Pat. No. 4,380,513 to Ruckel. Residual hydroxyl moieties in a rosin ester can also be reacted with an electrophilic reagent, such as an isocyanate, to produce the corresponding carbamate derivative. Examples of isocyanates are alkyl isocyanates such as methyl isocyanate, ethyl isocyanate, propyl isocyanate, isopropyl isocyanate, butyl isocyanate, isobutyl isocyanate, sec-butyl isocyanate, tert-butyl isocyanate, pentyl isocyanate, isopentyl isocyanate, neopentyl isocyanate, hexyl isocyanate, heptyl isocyanate, octyl isocyanate, ethylhexyl isocyanate, nonyl isocyanate, decyl isocyanate, undecyl isocyanate, dodecyl isocyanate, tridecyl isocyanate, tetradecyl isocyanate, pentadecyl isocyanate, hexadecyl isocyanate, heptadecyl isocyanate, octadecyl isocyanate, and cycloalkyl isocyanates such as cyclohexyl isocyanate, and isocyanates which contain an aromatic ring such as phenyl isocyanate and benzyl isocyanate. See, for example, U.S. Pat. No. 4,377,510 to Ruckel. Other suitable electrophilic reagents which can be used to react residual hydroxyl moieties include alkylating agents (e.g., methylating agents such as dimethylsulphate).

In some embodiments, the rosin or rosin ester is hydrogenated to obtain rosin esters having the desired chemical and physical properties for a particular application. Hydrogenation is a reduction reaction, which can result in addition of hydrogen to a reactant. Hydrogenation of an alkene moiety, such as an alkene present in the ring structure of a rosin acid moiety, can reduce the olefinic bond to produce the corresponding saturated moiety. Accordingly, hydrogenation can be performed, for example, to reduce the PAN number of a rosin or rosin ester. Methods of hydrogenating rosins or rosin esters are known in the art. Hydrogenation reactions can be carried out using a catalyst, such as a heterogeneous hydrogenation catalyst (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). The hydrogen source for the hydrogenation can by hydrogen ($H_2$) or a compound which can generate hydrogen under reaction conditions, such as formic acid, isopropanol or hydrazine.

An example of a commercially available hydrogenated rosin is Foral™ AX-E, which is marketed by Eastman Chemical Company. Staybelite™ Resin-E is an example of a commercially available partially hydrogenated rosin which is also marketed by Eastman Chemical Company. HYDROGAL is an example of a commercially available hydrogenated rosin which is marketed by DRT (Dérivés Résiniques et Terpéniques).

In some embodiments, the rosin or rosin ester is partly dimerized or polymerized to obtain after esterification rosin esters having the desired chemical and physical properties for a particular application. Rosin polymerization and dimerization reactions are known and described in patent applications such as for example U.S. Pat. No. 2,369,125 to Anderson, U.S. Pat. No. 2,017,866 to Morton, and U.S. Pat. No. 2,108,928 to Rummelsburg which are incorporated herein by reference in their entirety. Such rosin and rosin ester polymerization and dimerization reactions can be catalyzed by Bronsted acids such as sulfuric acid or by Lewis acids such as $AlCl_3$. An example of a commercially available polymerized rosin is Dymerex™ which is marketed by Eastman Chemical Company. POLYGRAL and DERTOPOL are examples of commercially available polymerized rosins which are marketed by DRT (Dérivés Résiniques et Terpéniques).

Rosin esters may also be obtained by a transesterification reaction such as, for example, the transesterification of a methyl ester derived from rosin with a higher boiling polyol like for example pentaerythritol or glycerol. An example of a commercially available methyl ester of a hydrogenated rosin is Foralyn™ 5020-F which is marketed by Eastman Chemical Company.

The rosin ester incorporated in the compositions provided herein can have a low hydroxyl number. In some embodiments, the rosin ester has a hydroxyl number, as measured using a modified version of the standard method provided in DIN 53240-2 (different solvent tetrahydrofuran was applied), of 6.0, 5.5, 5.0 or less (e.g., 4.5 or less, 4.0 or less, 3.5 or less, 3.0 or less, 2.5 or less, 2.0 or less, 1.5 or less, or 1.0 or less). The hydroxyl number is expressed as mg KOH per gram rosin ester sample.

The rosin ester incorporated in the compositions provided herein can have a low acid number. In some embodiments, the rosin ester has an acid number, as determined according to the method described in ASTM D465-05 (2010), of 15.0 or less (e.g., 14.5 or less, 14.0 or less, 13.5 or less, 13.0 or less, 12.5 or less, 12.0 or less, 11.5 or less, 11.0 or less, 10.5 or less, 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less). The acid number is expressed as mg KOH per gram rosin ester sample.

The rosin ester incorporated in the compositions provided herein can have a low hydroxyl number and a low acid number. In some embodiments, the sum of the hydroxyl number of the rosin ester, as measured using a modified version of the standard method provided in DIN 53240-2 (different solvent tetrahydrofuran was applied), and the acid number of the rosin ester, as determined according to the method described in ASTM D465-05 (2010), is 18.0 or less (e.g., 17.5 or less, 17.0 or less, 16.5 or less, 16.0 or less, 15.5 or less, 15.0 or less, 14.5 or less, 14.0 or less, 13.5 or less, 13.0 or less, 12.5 or less, 12.0 or less, 11.5 or less, 11.0 or less, 10.5 or less, 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, or 2.0 or less).

The rosin ester incorporated in the compositions provided herein can have a low PAN number. In some embodiments, the rosin ester can have PAN number, as determined according to the method described in ASTM D5974-00 (2010), of 8.0 or less (e.g., 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less). In certain embodiments, the rosin ester comprises at least 70% by weight of an esterified dehydroabietic acid and an esterified dihydroabietic acid (e.g., at least 75% by weight, at least 80% by weight, at least 85% by weight, or at least 90% by weight).

The rosin ester incorporated in the compositions provided herein can have a low hydroxyl number (e.g., a hydroxyl number of six, or five or less). In these cases, the hydroxyl number of the rosin ester can be low independent of the acid number of the rosin ester and/or the PAN number of the rosin ester. Accordingly, the acid number of the rosin ester and the PAN number of the rosin ester may independently be low as defined above, or higher. In some embodiments, the rosin ester incorporated in the compositions provided herein can have a low hydroxyl number (e.g., a hydroxyl number of six or five or less) and an acid number of fifteen or less (e.g., an acid number of ten or less, or an acid number of five or less). In some embodiments, the rosin ester incorporated in the compositions provided herein can have a low hydroxyl number (e.g., a hydroxyl number of six or five or less), and the sum of the hydroxyl number of the rosin ester and the acid number of the rosin ester can be eighteen or less (e.g., fifteen or less, ten or less, seven or less, or five or less).

In some embodiments, rosin ester incorporated in the compositions provided herein has a low hydroxyl number (a hydroxyl number of six or five or less) in combination with a low acid number (e.g., an acid number of ten or less). In some embodiments, the composition comprises a rosin ester which has a low hydroxyl number (a hydroxyl number of six, five or less) in combination with a low PAN number (e.g., a PAN number of eight or less). In certain embodiments, the composition comprises a rosin ester which has a low hydroxyl number (e.g., a hydroxyl number of six or five or less), a low acid number (e.g., an acid number of ten or less), and a low PAN number (e.g., a PAN number of eight or less). In some embodiments, the sum of the hydroxyl number and the acid number of the rosin ester incorporated in the compositions provided herein can be ten or less (e.g., seven or less, or five or less).

The rosin ester can comprise at least 60% by weight of an esterified dehydroabietic acid and an esterified dihydroabietic acid, based on the total weight of the rosin ester (e.g., at least 65% by weight of an esterified dehydroabietic acid and an esterified dihydroabietic acid, at least 70% by weight of an esterified dehydroabietic acid and an esterified dihydroabietic acid, at least 75% by weight of an esterified dehydroabietic acid and an esterified dihydroabietic acid, at least 80% by weight of an esterified dehydroabietic acid and an esterified dihydroabietic acid, at least 85% by weight of an esterified dehydroabietic acid and an esterified dihydroabietic acid, at least 90% by weight of an esterified dehydroabietic acid and an esterified dihydroabietic acid, or at least 95% by weight of an esterified dehydroabietic acid and an esterified dihydroabietic acid).

In some embodiments, the weight ratio of esterified dehydroabietic acid to esterified dihydroabietic acid in the rosin ester is 1:0.25 or less (e.g., 1:0.30 or less, 1:0.35 or less, 1:0.40 or less, 1:0.45 or less, 1:0.50 or less, 1:0.55 or less, 1:0.60 or less, 1:0.65 or less, 1:0.70 or less, 1:0.75 or less, 1:0.80 or less, 1:0.85 or less, 1:0.90 or less, or 1:0.95 or less). In some embodiments, the weight ratio of esterified dehydroabietic acid to esterified dihydroabietic acid in the rosin ester is at least 1:1 (e.g., at least 1:0.95, at least 1:0.90, at least 1:0.85, at least 1:0.80, at least 1:0.75, at least 1:0.70, at least 1:0.65, at least 1:0.60, at least 1:0.55, at least 1:0.50, at least 1:0.45, at least 1:0.40, at least 1:0.35, or at least 1:0.30). The weight ratio of esterified dehydroabietic acid to esterified dihydroabietic acid in the rosin ester can range from any of the minimum values described above to any of the maximum values described above. For example, the weight ratio of esterified dehydroabietic acid to esterified dihydroabietic acid in the rosin ester can range from 1:1 to 1:0.25 (e.g., from 1:0.80 to 1:0.25, from 1:0.70 to 1:0.35, from 1:0.65 to 1:0.40, or from 1:0.55 to 1:0.40).

The rosin ester incorporated in the compositions provided herein can have a low neat Gardner color. In some embodiments, the rosin ester has a neat Gardner color, as determined according to the method described in ASTM D1544-04 (2010), of 4.0 or less (e.g., 3.5 or less, 3.0 or less, 2.5 or less, 2.0 or less, 1.5 or less, 1.0 or less, or 0.5 or less).

In certain embodiments, the rosin ester is derived from a polyhydric alcohol, such as a polyhydric alcohol selected from the group consisting of ethylene glycol, propylene glycol, diethylene glycol, triethylene glycol, tetraethylene glycol, trimethylene glycol, glycerol, trimethylolpropane, trimethylolethane, pentaerythritol, dipentaerythritol, mannitol, and combinations thereof. The rosin ester can have a weight average molecular weight, as determined using gel permeation chromatography (GPC) as described in ASTM D5296-05, of at least 800 g/mol (e.g., at least 850 g/mol, at least 900 g/mol, at least 950 g/mol, at least 1000 g/mol, at least 1050 g/mol, at least 1100 g/mol, at least 1150 g/mol, at least 1200 g/mol, at least 1250 g/mol, at least 1300 g/mol, at least 1350 g/mol, at least 1400 g/mol, at least 1450 g/mol, at least 1500 g/mol, at least 1550 g/mol, at least 1600 g/mol, at least 1650 g/mol, at least 1700 g/mol, at least 1750 g/mol, at least 1800 g/mol, at least 1850 g/mol, at least 1900 g/mol, or at least 1950 g/mol). The rosin ester can have a weight average molecular weight of 2000 g/mol or less (e.g., 1950 g/mol or less, 1900 g/mol or less, 1850 g/mol or less, 1800 g/mol or less, 1750 g/mol or less, 1700 g/mol or less, 1650 g/mol or less, 1600 g/mol or less, 1550 g/mol or less, 1500 g/mol or less, 1450 g/mol or less, 1400 g/mol or less, 1350 g/mol or less, 1300 g/mol or less, 1250 g/mol or less, 1200 g/mol or less, 1150 g/mol or less, 1100 g/mol or less, 1050 g/mol or less, 1000 g/mol or less, 950 g/mol or less, 900 g/mol or less, or 850 g/mol or less).

The rosin ester can have a weight average molecular weight ranging from any of the minimum values above to any of the maximum values above. For example, the rosin ester can have a weight average molecular weight of from 800 g/mol to 2000 g/mol (e.g., from 900 g/mol to 1600 g/mol, or from 1000 g/mol to 1500 g/mol).

The rosin ester can be present in the composition in varying amounts, depending upon the desired properties of the composition. In some embodiments, the rosin ester comprises at least 5% by weight of the composition (e.g., at least 10% by weight of the composition, at least 15% by weight of the composition, at least 20% by weight of the composition, at least 25% by weight of the composition, at least 30% by weight of the composition, at least 35% by weight of the composition, at least 40% by weight of the composition, or at least 45% by weight of the composition). In some embodiments, the rosin ester comprises 50% or less of the composition by weight (e.g., 45% or less by weight, 40% or less by weight, 35% or less by weight, 30% or less by weight, 25% or less by weight, 20% or less by weight, 15% or less by weight, or 10% or less by weight). The rosin ester can be present in the composition in an amount ranging from any of the minimum values above to any of the maximum values above.

In some embodiments, the rosin ester includes more than one type of rosin ester. For example, the rosin ester can include a mixture of two rosin esters which are derived from the same type of rosin and two different alcohols (e.g., a pentaerythritol ester of tall oil rosin and a glycerol ester of tall oil rosin), a mixture of two rosin esters which are derived from the same alcohol and two different types of rosin (e.g., a pentaerythritol ester of tall oil rosin and a pentaerythritol ester of gum rosin), or a mixture of two rosin esters which are derived from two different alcohols and two different types of rosin (e.g., a pentaerythritol ester of tall oil rosin and a glycerol ester of gum rosin).

In some cases, the composition can be an adhesive formulation (e.g., hot-melt adhesive formulation), an ink formulation, a coating formulation, a rubber formulation, a sealant formulation, an asphalt formulation or a road making bitumen based formulation, or a pavement marking formulation (e.g., a thermoplastic road marking formulation).

In certain embodiments, the composition is a hot-melt adhesive. In these embodiments, the rosin ester can function as all or a portion of the tackifier component in a traditional hot-melt adhesive formulation. The copolymer derived from ethylene and a vinyl alkanoate (e.g., vinyl acetate) or the copolymer derived from ethylene and an acrylate ester or methacrylate ester (e.g., n-butyl acrylate), the rosin ester and one or more additional components can be present in amounts effective to provide a hot-melt adhesive having the characteristics required for a particular application. For example, The copolymer derived from ethylene and a vinyl alkanoate (e.g., vinyl acetate) or the copolymer derived from ethylene and an acrylate ester or methacrylate ester (e.g., n-butyl acrylate) can be from 10% by weight to 70% by weight of the hot-melt adhesive composition (e.g., from 20% by weight to 60% by weight of the hot-melt adhesive composition, from 25% by weight to 50% by weight of the hot-melt adhesive composition, or from 30% by weight to 40% by weight of the hot-melt adhesive composition). The rosin ester can be from 1% by weight to 50% by weight of the hot-melt adhesive composition (e.g., from 10% or 25% by weight to 45% by weight of the hot-melt adhesive composition, or from 30% by weight to 40% by weight of the hot-melt adhesive composition).

The hot-melt adhesive can further include one or more additional components, including additional tackifiers, waxes, stabilizers (e.g., antioxidants and UV stabilizers), plasticizers (e.g., benzoates and phthalates), paraffin oils, nucleating agents, optical brighteners, pigments dyes, glitter, biocides, flame retardants, anti-static agents, slip agents, anti-blocking agents, lubricants, ferromagnetic particles, hygroscopic water-retaining materials, electrically conductive particles and fillers. In some embodiments, the hot-melt adhesive further comprises a wax. Suitable waxes include, but are not limited to, paraffin-based waxes and synthetic Fischer-Tropsch waxes. The waxes can be from 10% by weight to 40% by weight of the hot-melt adhesive composition, based on the total weight of the composition (e.g., from 20% by weight to 30% by weight of the hot-melt adhesive composition). Fillers can be used for reducing cost, adding bulk, improving cohesive strength and altering properties. Examples of fillers are: calcium carbonate, barium sulfate, talc, silica, carbon black, clays.

Examples of additional tackifiers or resins that can be included in the hot-melt adhesive are terpene phenolics, hydrogenated terpene phenolics, aromatic hydrocarbon resins such as styrene and substituted styrene based resins, C9 resins, C5/C9 aliphatic/aromatic resins, and styrenated terpene based resins, aliphatic and cycloaliphatic hydrocarbon resins and polyterpenic resins including mixtures thereof, aromatic modified cycloaliphatic hydrocarbon resins and the like In some embodiments, the composition is a hot-melt adhesive and the copolymer derived from ethylene and a vinyl alkanoate is a copolymer derived from vinyl acetate. In certain embodiments, the copolymer derived from ethylene and vinyl acetate is EVA. In certain embodiments, the EVA can be derived from 10% by weight to 40% by weight vinyl acetate, based on the total weight of all of the monomers polymerized to form the EVA (e.g., from 17% by weight to 34% by weight vinyl acetate).

In certain embodiments, the composition is a thermoplastic road marking formulation. The thermoplastic road marking formulation can include from 5% by weight to 25% by weight of a rosin ester, based on the total weight of the thermoplastic road marking formulation (e.g., from 10% by weight to 20% by weight of the thermoplastic road marking formulation). The thermoplastic road marking formulation can further include a copolymer derived from ethylene and a vinyl alkanoate, such as vinyl acetate (e.g., up to 10% of a copolymer derived from ethylene and a vinyl alkanoate such as vinyl acetate, up to 5% of a copolymer derived from ethylene and a vinyl alkanoate such as vinyl acetate, or from 0.1% by weight to 1.5% by weight of a copolymer derived from ethylene and a vinyl alkanoate such as vinyl acetate, such as EVA), a pigment (e.g., from 1% by weight to 10% by weight titanium dioxide), and glass beads (e.g., from 30% by weight to 40% by weight), and a filler (e.g., calcium carbonate which can make up the balance of the composition up to 100% by weight). The thermoplastic road marking formulation can further include an oil (e.g., from 1% by weight to 5% by weight percent mineral oil), a wax (e.g., from 1% by weight to 5% by weight percent paraffin-based wax or synthetic Fischer-Tropsch wax), a stabilizer (e.g., from 0.1% by weight to 0.5% by weight stearic acid), and, optionally, polymers, copolymers, terpolymers and grafted polymers other than copolymers derived from ethylene and vinyl alkanoates and/or binders other than the rosin ester blend as described herein.

As discussed above, by incorporating a rosin ester having particular properties (e.g., a low hydroxyl number, a low acid number, a low PAN number, or combinations thereof) into a copolymer derived from ethylene and a vinyl alkanoate such as vinyl acetate, or with a copolymer derived from ethylene and an acrylate ester or methacrylate ester monomer such as n-butyl acrylate, the composition can exhibit improved viscosity stability on aging at elevated temperatures (thermal aging). The viscosity stability of the compositions provided herein upon thermal aging can be determined according to methods described in ASTM D4499-07. Round robin tests have shown that the ASTM D4499-07 standard test method for Heat Stability is well suited for testing of the heat stability, including viscosity stability, of adhesives based on an EVA copolymer.

In some embodiments, the composition exhibits less than a 10% change in viscosity upon incubation at 177° C. for 96 hours, when analyzed using the modified ASTM D4499-07 method described below (e.g., less than a 9% change in viscosity, less than an 8% change in viscosity, less than a 7.5% change in viscosity, less than a 7% change in viscosity, less than a 6% change in viscosity, less than a 5% change in viscosity, less than a 4% change in viscosity, less than a 3% change in viscosity, less than a 2.5% change in viscosity, less than a 2% change in viscosity, or less than a 1% change in viscosity). In some embodiments, the composition exhibits substantially no change in viscosity (i.e., less than a 0.5% change in viscosity) upon incubation at 177° C. for 96 hours. In certain cases, the composition exhibits a viscosity of from 1.2 to 1.4 Pa·s at 170° C. after incubation at 177° C. for 96 hours, as measured using a parallel-plate rheometer (Anton Paar—Physica MCR101, PP25).

In some embodiments, the composition exhibits less than 30% char formation upon incubation at 177° C. for 9 days, less than 20% char formation upon incubation at 177° C. for 9 days, less than 15% char formation upon incubation at 177° C. for 9 days, or even less than 10% char formation upon incubation at 177° C. for 9 days.

By incorporating a rosin ester having particular properties (e.g., a low hydroxyl number, a low acid number, a low PAN number, or combinations thereof) into a polymer derived from a vinyl alkanoate such as vinyl acetate, or with a copolymer derived from ethylene and an acrylate ester or methacrylate ester monomer such as n-butyl acrylate, the composition can exhibit improved color stability upon thermal aging. In some embodiments, the composition has a Gardner color, as determined according to the method described in ASTM D1544-04 (2010), of 10.0 or less after incubation at 177° C. for 96 hours (e.g., 9.5 or less, 9.0 or less, 8.5 or less, 8.0 or less, 7.5 or less, 7.0 or less, 6.5 or less, 6.0 or less, 5.5 or less, 5.0 or less, 4.5 or less, or 4.0 or less).

The composition can optionally have low sulfur content. Sulfur content can be measured with an ANTEK® 9000 sulfur analyzer using the standard methods described in ASTM D5453-05. In some embodiments, the composition comprises less than 400 ppm sulfur (e.g., less than 350 ppm sulfur, less than 300 ppm sulfur, less than 250 ppm sulfur, or less than 200 ppm sulfur). In some embodiments, the sulfur content of the composition can be reduced by treating the rosin ester with a sorbent, such as activated carbon, to decrease the amount of sulfur in the rosin ester.

As discussed above, by incorporating a rosin ester having particular properties (e.g., a low hydroxyl number, a low acid number, a low PAN number, or combinations thereof) into a copolymer derived from ethylene and a vinyl alkanoate such as vinyl acetate, or with a copolymer derived from ethylene and an acrylate ester or methacrylate ester monomer such as n-butyl acrylate, the composition can exhibit a lower amount of char particle formation on aging at elevated temperatures (thermal aging). The amount of char particle formation of the compositions provided herein upon thermal aging can be determined according to methods described herein.

The compositions provided herein can be used in a variety of applications, including as adhesives (e.g., hot-melt adhesives), inks, coatings, rubbers, sealants, asphalt, and thermoplastic road markings and pavement markings. In some embodiments, the compositions are hot-melt adhesives used, for example, in conjunction with papers and packaging (e.g., to adhere surfaces of corrugated fiberboard boxes and paperboard cartons during assembly and/or packaging, to prepare self-adhesive labels, to apply labels to packaging, or in other applications such as bookbinding), in conjunction with non-woven materials (e.g., to adhere nonwoven material with a backsheet during the construction of disposable diapers), in adhesive tapes, in apparel (e.g., in the assembly of footware, or in the assembly of multi-wall and specialty handbags), in electrical and electronic bonding (e.g., to affix parts or wires in electronic devices), in general wood assembly (e.g., in furniture assembly, or in the assembly of doors and mill work), and in other industrial assembly (e.g., in the assembly of appliances).

Also provided are methods for preparing polymer compositions, including hot-melt adhesives. Methods for preparing polymer compositions can include mixing a copolymer derived from ethylene and a vinyl alkanoate (e.g., a copolymer derived from vinyl acetate) or mixing a copolymer derived from ethylene and an acrylate ester or methacrylate ester monomer such as n-butyl acrylate, and a rosin ester as described herein having a hydroxyl number of six or five or less and an acid number of fifteen or less (e.g., ten or less, or five or less). Methods for preparing polymer compositions can also include mixing a polymer derived from a vinyl alkanoate (e.g., a polymer derived from vinyl acetate), or mixing a copolymer derived from ethylene and an acrylate ester or methacrylate ester monomer such as n-butyl acrylate, and a rosin ester as described herein, wherein the hydroxyl number of the rosin ester is six, five or less, and wherein the sum of the hydroxyl number and the acid number is eighteen or less (e.g., fifteen or less, ten or less, seven or less, or five or less). Methods for preparing polymer compositions can also include mixing a polymer derived from a vinyl alkanoate (e.g., a polymer derived from vinyl acetate), or mixing a copolymer derived from ethylene and an acrylate ester or methacrylate ester monomer such as n-butyl acrylate, and a rosin ester as described herein, wherein the sum of the hydroxyl number and the acid number of the rosin ester is ten or less (e.g., seven or less, or five or less). Methods can further include adding one or more additional components to the composition, such as an additional tackifier, a resin, a wax, a stabilizer (e.g., an antioxidant UV stabilizer), a plasticizer (e.g., benzoates, phthalates), paraffin oil, a nucleating agent, an optical brightener, a pigment, a dye, glitter, a biocide, a flame retardant, an anti-static agent, a slip agent, an anti-blocking agent, a lubricants, a filler, or a combination thereof. Methods can further include esterifying a rosin to obtain a rosin ester having the desired properties (e.g., a hydroxyl number of six or five or less, an acid number of fifteen or less, etc.), which can then be mixed with the polymer.

An exemplary road marking formulation may be prepared by: (a) charging a standard mixer with 16 parts rosin ester, 2.8 parts oil (e.g., a mineral oil, such as mineral oil; obtained from Statoil), 1 part wax (e.g., polyethylene wax, such as AC6 PE-wax obtained from Honeywell), 1 part of a copolymer derived from ethylene and a vinyl alkanoate such as vinyl acetate (e.g., poly(ethylene-co-vinyl acetate) such as Elvax 22W obtained from DuPont), 0.2 parts fatty acid (e.g., stearic acid), 5.3 parts pigment (e.g., titanium dioxide, such as titanium dioxide obtained from Kronos), 42.4 parts filler (e.g., calcium carbonate), and 37.1 parts reflective filler (e.g., glass beads, such as glass beads obtained from Swarco); and (b) heating (e.g., at 180° C.) and blending at low speed to avoid introducing air bubbles into the melt.

By way of non-limiting illustration, examples of certain embodiments of the present disclosure are included below.

EXAMPLES

General Methods

All materials were characterized using the following methods unless otherwise stated. Hydroxyl numbers were determined according to a modified method (different solvent tetrahydrofuran was applied) of DIN 53240-2 entitled "Determination of Hydroxyl Value—Part 2: Method with Catalyst," which is incorporated herein by reference in its entirety. The rosin ester (dissolved in tetrahydrofuran) was reacted with acetic anhydride in the presence of 4-dimethylaminopyridine. Residual acetic anhydride was hydrolyzed and the resulting mixture titrated with an alcoholic solution of potassium hydroxide (0.5 M). Acid numbers were determined according to method described in ASTM D465-05 (2010) entitled "Standard Test Methods for Acid Number of Naval Stores Products Including Tall Oil and Other Related Products," which is incorporated herein by reference in its entirety. Softening points were determined according to method described in ASTM E28-99 (2009) entitled "Standard Test Methods for Softening Point of Resins Derived from Naval Stores by Ring-and-Ball Apparatus," which is incorporated herein by reference in its entirety. PAN numbers were determined according to method described in ASTM D5974-00 (2010) entitled "Standard Test Methods for Fatty and Rosin Acids in Tall Oil Fractionation Products by Capillary Gas Chromatography," which is incorporated herein by reference in its entirety. The Gardner color of all materials was measured according to the Gardner Color scale as specified in ASTM D1544-04 (2010) entitled "Standard Test Method for Color of Transparent Liquids (Gardner Color Scale)," which is incorporated herein by reference in its entirety. Gardner colors were measured neat using a Dr Lange LICO® 200 colorimeter.

Preparation of Rosin Esters

Example 1

Tall oil rosin (1500 grams, having an acid number of 180 mg KOH/g rosin, a softening point of 75° C., and a color of 4.7 Gardner (neat)) was charged into a four-necked flask (2 L) and heated to 200° C. under a nitrogen atmosphere. After the tall oil rosin was completely melted, the resulting solution was mechanically stirred. ROSINOX® (poly-tert-butylphenoldisulfide; commercially available from Arkema Inc.) (7.50 g) was added. The addition of distilled water (160 µL/min) using a dosage pump was started. The reaction mixture was heated to 275° C. and left at this temperature for 3 hours. Water addition was stopped and the mixture (having an acid number of 172 mg KOH/g rosin after this rosin disproportionation reaction) was cooled to 200° C. Pentaerythritol (133.07 g) and IRGANOX® 1425 (calcium-bis(((3,5-bis(1,1-dimethylethyl)-4-hydroxyphenyl)methyl)-ethylphosphonate); commercially available from BASF) (5.25 g) were added, and the reaction mixture was heated to 275° C. (heating rate of 30° C./hour). The reaction mixture was heated at 275° C. for 10 hours. The residual rosin acid was stripped off during two hours of nitrogen sparging and the reaction mixture was subsequently cooled to 180° C. The rosin ester was then discharged and characterized. The obtained rosin ester 1 exhibited a softening point of 106.4° C., an acid number of 2.6 mg KOH/g rosin ester, a hydroxyl number of 0.8 mg KOH/g rosin ester, a PAN number of 2.6%, and a color of less than 2 Gardner (neat).

Example 1a

The procedure of Example 1 was applied, except that a different tall oil rosin (702 g of SYLVAROS® 90, acid number 174.7 mg KOH/g rosin, softening point of 61.3° C. and a color of 5.5 Gardner (1:1 in toluene), commercially available from Arizona Chemical) was used. ROSINOX® (3.52 g), pentaerythritol (62.11 g) and IRGANOX® 1425 (2.46 g) were added. After the disproportionation step the rosin had an acid number of 161.9 mg KOH/g rosin. The esterification time at 275° C. was 8.75 hours. The residual rosin acid was stripped off during 2.5 hours of nitrogen sparging. The obtained rosin ester 1a was analyzed to have a softening point of 96.3° C., an acid number of 4.3 mg KOH/g rosin ester, a hydroxyl number of 1.0 mg KOH/g rosin ester, and a PAN number of 4.4%.

Example 2 (Comparative)

The procedure of Example 1 was applied, except that a larger amount of pentaerythritol (187.86 g) was used. The obtained rosin ester 2 was analyzed to have a softening point of 99.9° C., an acid number of 2.5 mg KOH/g rosin ester, a hydroxyl number of 29.5 mg KOH/g rosin ester, and a PAN number of 2.3%.

Example 3 (Comparative)

The procedure of Example 1 was applied, except that a slightly different amount of pentaerythritol (125.24 g) was used and that no nitrogen sparge was conducted. The obtained rosin ester 3 was analyzed to have a softening point of 89.2° C., an acid number of 32.9 mg KOH/g rosin ester, a hydroxyl number of 1.5 mg KOH/g rosin ester and a PAN number of 2.6%.

Example 4 (Comparative)

The procedure of Example 1 was applied, except that a modified amount of pentaerythritol (154.73 g) was used and that the mixture was cooled and discharged (without nitrogen sparge) after 5 hours at 275° C. The obtained rosin ester 4 was analyzed to have a softening point of 87.5° C., an acid number of 28.9 mg KOH/g rosin ester, a hydroxyl number of 22.6 mg KOH/g rosin ester, and a PAN number of 5.0%.

Example 5

700 g of tall oil rosin (SYLVAROS® 90, commercially available from Arizona Chemical) with an acid number of 174.8 was charged into a four-necked flask (1 L) and heated to 200° C. under a nitrogen atmosphere. After the rosin was completely melted, agitation was started and pentaerythritol (63.13 g), IRGANOX® 1425 (2.46 g) and ROSINOX® (3.50 g) were added. The reaction mixture was heated to 275° C. (heating rate of 30° C./hour) and left at this temperature for 7.5 hours. Residual rosin acid was stripped off during a 2 hour nitrogen sparge, and the reaction mixture was subsequently cooled to 180° C. The obtained rosin ester 5 was discharged and analyzed to have a softening point of 100.1° C., an acid number of 1.4 mg KOH/g rosin ester, a hydroxyl number of 1.4 mg KOH/g rosin ester, and a PAN number of 4.5%.

Example 5a

The procedure of Example 5 was applied, except that 700 g of a different batch of the SYLVAROS® 90 (with an acid number of 175.1 mg KOH/g rosin, softening point of 64.7° C.) and a modified amount of pentaerythritol (67.05 g) was used and the reaction time at top temperature was extended to 8.5 hours. Residual rosin acid was stripped off during a 3 hour nitrogen sparge. The obtained rosin ester 5a was analyzed to have a softening point of 97.1° C., an acid number of 1.6 mg KOH/g rosin ester, a hydroxyl number of 1.5 mg KOH/g rosin ester, and a PAN number of 4.3%.

Example 6 (Comparative)

The procedure of Example 5 was applied, except that a modified amount of pentaerythritol (77.99 g) was used. The obtained rosin ester 6 was analyzed to have a softening point of 99.7° C., an acid number of 2.0 mg KOH/g rosin ester, a hydroxyl number of 13.4 mg KOH/g rosin ester, and a PAN number of 5.2%.

Example 7

The procedure of example 1 was applied starting from tall oil rosin (350 gram SYLVAROS® HYR (acid number 179 mg KOH/g rosin), commercially available from Arizona Chemical), ROSINOX® (1.75 gram), pentaerythritol (39.6 g) and IRGANOX® 1425 (1.29 g). After the disproportionation step the rosin had an acid number of 169.5 mg KOH/g rosin. The esterification time at 275° C. was 9 hours. The obtained rosin ester 7 had a softening point of 105.6° C., an acid number of 1.1 mg KOH/g rosin ester, a hydroxyl number of 11.9 mg KOH/g rosin ester, a PAN number of 3.5%, and a color of 4.2 Gardner (neat).

Example 8

The procedure of example 1 was applied starting from tall oil rosin (350 gram, acid number 181 mg KOH/g rosin, softening point 77° C.), ROSINOX® (1.75 gram), pentaerythritol (31.05 g) and IRGANOX® 1425 (1.23 g). After the disproportionation step the rosin had an acid number of 172.0 mg KOH/g rosin. The esterification time at 275° C. was 7 hours. The obtained rosin ester 8 had a softening point of 108.2° C., an acid number of 2.5 mg KOH/g rosin ester, a hydroxyl number of 4.4 mg KOH/g rosin ester, a PAN number of 4.5%, and a color of 3.0 Gardner (neat).

Example 9

The procedure of example 1 was applied starting from tall oil rosin (350 gram, acid number 181 mg KOH/g rosin, softening point 77° C.), ROSINOX® (1.75 gram), pentaerythritol (35.68 g) and IRGANOX® 1425 (1.23 g). After the disproportionation step the rosin had an acid number of 172.0 mg KOH/g rosin. After 5 hours of esterification time at 275° C. the rosin ester was discharged (without nitrogen stripping) and characterized. The obtained rosin ester 9 had a softening point of 96.0° C., an acid number of 26.9 mg KOH/g rosin ester, a hydroxyl number of 22.0 mg KOH/g rosin ester, and a PAN number of 4.6%.

Example 10

The procedure of example 1 was applied starting from *Pinus massoniana* GUM rosin, (350 gram, acid number 174 mg KOH/g rosin), ROSINOX® (1.52 gram), pentaerythritol (29.83 g) and IRGANOX® 1425 (1.23 g). After the disproportionation step the rosin had an acid number of 165.0 mg KOH/g rosin. The esterification time at 275° C. was 7 hours. The obtained rosin ester 10 had a softening point of 109.2° C., an acid number of 3.9 mg KOH/g rosin ester, a hydroxyl number of 1.1 mg KOH/g rosin ester, a PAN number of 2.9%, and a color of 3.8 Gardner (neat).

Example 11

The procedure of example 1 was applied starting from *Pinus massoniana* GUM rosin (350 gram, acid number 174 mg KOH/g rosin), ROSINOX® (1.52 gram), pentaerythritol (36.79 g) and IRGANOX® 1425 (1.23 g). After the disproportionation step the rosin had an acid number of 165.0 mg KOH/g rosin. After 6.5 hours of esterification time at 275° C. the rosin ester was discharged (without nitrogen stripping) and characterized. The obtained rosin ester 11 had a softening point of 95.9° C., an acid number of 18.1 mg KOH/g rosin ester, a hydroxyl number of 18.4 mg KOH/g rosin ester, a PAN number of 3.6%, and a color of 3.9 Gardner (neat).

Example 12

Tall oil rosin (700 grams, acid number 181 mg KOH/g rosin, softening point 75° C.) was charged into a four-necked flask (1 L) and heated to 200° C. under a nitrogen atmosphere. After the tall oil rosin was completely melted, the resulting solution was mechanically stirred. ROSINOX® (3.58 g) was added. The addition of distilled water (160 µL/min) using a dosage pump was started. The reaction mixture was heated to 275° C. and left at this temperature for 7 hours. Water addition was stopped and the mixture (having an acid number of 166 mg KOH/g rosin) was cooled to 180° C. Glycerol (54.08 g) and IRGANOX® 1425 (2.45 g) were added, and the reaction mixture was heated to 250° C. (heating rate of 30° C./hour). The reaction mixture was heated at 250° C. for 11.5 hours. The residual rosin acid was stripped off during two hours of nitrogen sparging and the reaction mixture was subsequently cooled to 180° C. The rosin ester was then discharged and characterized. The obtained rosin ester 12 had a softening point of 92.0° C., an acid number of 4.0 mg KOH/g rosin ester, a hydroxyl number of 0.0 mg KOH/g rosin ester, a PAN number of 3.8%, and a color of 0.9 Gardner (neat).

Example 13

The procedure of example 12 was applied starting from tall oil rosin (701 gram, acid number 181 mg KOH/g rosin, softening point 75° C.), ROSINOX® (3.52 gram), glycerol (75.93 g) and IRGANOX® 1425 (2.45 g). The rosin was disproportionated for 6 hours and the resulting disproportionated rosin exhibited an acid number of 169.2 mg KOH/g rosin. After 4 hours of esterification time at 250° C. the rosin ester was discharged (without nitrogen stripping) and characterized. The obtained rosin 13 ester exhibited a softening point of 72.7° C., an acid number of 16.0 mg KOH/g rosin ester, a hydroxyl number of 28.5 mg KOH/g rosin ester, a PAN number of 6.9%, and a color of 0.8 Gardner (neat).

Example 13a

Tall oil rosin (352 grams) was charged into a four-necked flask (0.5 L) and held under a nitrogen atmosphere for 25 minutes and subsequently heated to 200° C. After the tall oil rosin was completely melted, the resulting solution was mechanically stirred. ROSINOX® (1.76 g) was added. The addition of distilled water (3.9 mL/min) using a dosage pump was started. The reaction mixture was heated to 275° C. and left at this temperature for 3 hours. Water addition was stopped and the mixture (having an acid number of 172) was cooled to 180° C. IRGANOX® 1425 (1.23 g) and Glycerol (33.20 g) were added, and the reaction mixture was heated to 250° C. (heating rate of 30° C./hour). The reaction mixture was heated at 250° C. for 12.75 hours. The residual rosin acid was stripped off during two hours of nitrogen sparging and the reaction mixture was subsequently cooled to 180° C. The obtained rosin ester 14 was then discharged and characterized. The rosin ester had a softening point of 90.6° C., an acid number of 4.4 mg KOH/g rosin ester, a hydroxyl number of 0.4 mg KOH/g rosin ester, a PAN number of 4.48%, and a color of less than 1 Gardner (neat).

Example 14

The procedure of example 1 was applied starting from tall oil rosin (350 gram SYLVAROS® HYR (acid number 180 mg KOH/g rosin), commercially available from Arizona Chemical), ROSINOX® (1.75 gram), pentaerythritol (30.94 g) and IRGANOX® 1425 (1.23 g). After the disproportionation step the rosin had an acid number of 171.4 mg KOH/g rosin. The esterification time at 275° C. was 7 hours. The obtained rosin ester 14 had a softening point of 106.9° C., an acid number of 2.0 mg KOH/g rosin ester, a hydroxyl number of 2.7 mg KOH/g rosin ester, a PAN number of 4.9%, and a color of 2.8 Gardner (neat).

Example 15

The procedure of example 1 was applied starting from tall oil rosin (351 gram, acid number 178 mg KOH/g rosin, softening point 77° C.), ROSINOX® (1.77 gram), dipentaerythritol (31.26 g) and IRGANOX® 1425 (1.23 g). After the disproportionation step the rosin had an acid number of 168.3 mg KOH/g rosin. The esterification time at 275° C. was 13 hours. The obtained rosin ester 15 had a softening point of 120.3° C., an acid number of 2.6 mg KOH/g rosin ester, a hydroxyl number of 0.0 mg KOH/g rosin ester, a PAN number of 2.4%, and a color of 4.2 Gardner (neat).

Example 16

The procedure of example 1 was applied starting from tall oil rosin (351 gram, acid number 178 mg KOH/g rosin, softening point 77° C.), ROSINOX® (1.75 gram), dipentaerythritol (47.80 g) and IRGANOX® 1425 (1.23 g). After the disproportionation step the rosin had an acid number of 172.0 mg KOH/g rosin. The esterification time at 275° C. was 6.25 hours. The obtained rosin ester 16 had a softening point of 110.0° C., an acid number of 2.1 mg KOH/g rosin ester, a hydroxyl number of 27.9 mg KOH/g rosin ester, a PAN number of 4.3%, and a color of 4.5 Gardner (neat).

Example 17

The procedure of example 1 was applied starting from tall oil rosin (177 gram SYLVAROS® HYR (acid number 179 mg KOH/g rosin), 177 gram SYLVAROS® NCY (acid number 170 mg KOH/g rosin), both commercially available from Arizona Chemical), ROSINOX® (1.77 gram), pentaerythritol (18.62 g), triethylene glycol (6.87 g), trimethylolpropane (12.23 g) and IRGANOX® 1425 (1.24 g). After the disproportionation step the rosin had an acid number of 170.0 mg KOH/g rosin. The esterification time at 275° C. was 8 hours. The obtained rosin ester 17 had a softening point of 88.1° C., an acid number of 5.1 mg KOH/g rosin ester, a hydroxyl number of 0.7 mg KOH/g rosin ester, a PAN number of 2.6%, and a color of 6.1 Gardner (neat).

Example 18

The procedure of example 1 was applied starting from tall oil rosin (177 gram SYLVAROS® HYR (acid number 179 mg KOH/g rosin), 177 gram SYLVAROS® NCY (acid number 170 mg KOH/g rosin), both commercially available from Arizona Chemical), ROSINOX® (1.77 gram), pentaerythritol (23.28 g), triethylene glycol (8.56 g), trimethylolpropane (15.29 g) and IRGANOX® 1425 (1.23 g). After the disproportionation step the rosin had an acid number of 170.0 mg KOH/g rosin. After 8 hours of esterification time at 275° C. the rosin ester was discharged (without nitrogen stripping) and characterized. The obtained rosin ester 18 had a softening point of 79.5° C., an acid number of 17.3 mg KOH/g rosin ester, a hydroxyl number of 20.5 mg KOH/g rosin ester, a PAN number of 2.5%, and a color of 6.4 Gardner (neat).

Example 19

Rosin ester 2 (200 g) was charged into a four-necked flask (0.5 L) and heated under a nitrogen atmosphere. A dropping funnel and a condenser where installed and agitation was started after the rosin ester was melted. At a temperature of 145° C. acetic anhydride (21.5 g) was added dropwise. After 2 hours at 145° C. the condenser was removed and the reaction mixture was heated to 225° C. (heating rate of 30° C./hour). The obtained rosin ester 19 was discharged and analyzed to have a softening point of 94.7° C., an acid number of 2.5 mg KOH/g rosin ester and a hydroxyl number of 0.0 mg KOH/g rosin ester.

Example 20

The procedure of example 5 was applied starting from tall oil rosin (300 gram SYLVAROS® 90 (acid number 176 mg KOH/g rosin), commercially available from Arizona Chemical), ROSINOX® (1.5 gram), pentaerythritol (31.744 g), adipic acid (6.0 g) and IRGANOX® 1425 (1.05 g). The esterification time at 275° C. was 12 hours. Thereafter, residual rosin acid was stripped off during a 2 hour nitrogen sparge and the reaction mixture was subsequently cooled to 200° C. The obtained rosin ester 20 was discharged and analyzed to have a softening point of 98.4° C., an acid number of 2.7 mg KOH/g rosin ester and a hydroxyl number of 0.9 mg KOH/g rosin ester.

Formulation of EVA28 (28% VA Content) Containing Hot-Melt Adhesives

Hot-melt adhesives were formulated using the rosin esters prepared in Examples 1-18. The hot-melt adhesive compositions were prepared by blending 40 wt % EVATANE® 28-420 EVA (EVA28, EVA copolymer with a 27-29 wt % vinyl acetate (VA) content, commercially available from Arkema Inc.), 25 wt % SASOLWAX® H1 (unmodified Fischer-Tropsch wax commercially available from Sasolwax), 34.5 wt % rosin ester, and 0.5% IRGANOX® 1010 (Pentaerythritol tetrakis(3-(3,5-di-tert-butyl-4-hydroxyphenyl)propionate), commercially available from BASF).

The thermal stability of the hot-melt adhesive formulations was measured using a thermal stability test adapted from the test methods described in ASTM D4499-07, entitled "Standard Test Method for Heat Stability of Hot-Melt Adhesives," which is incorporated by reference in its entirety. The test methods described in ASTM D4499-07 were performed using adapted cylindrical glass jar dimensions (inside diameter of 38 mm, internal height of 65 mm and an opening with a diameter of 31 mm, external diameter of 44 mm, external height of 70 mm, glass thickness of 3 mm, 50 mL content, commercially available from Fisher Scientific, part of Thermo Fisher Scientific), which allowed testing to be performed using smaller amounts of hot-melt adhesive.

All reported viscosities were measured at a constant temperature of 170° C. using a parallel-plate rheometer (Anton Paar—Physica MCR101, plate-plate diameter was 25 mm with a gap of 1 mm) The shear rate was varied linearly from 1 to 50 s$^{-1}$ and backwards to 1 s$^{-1}$. The resulting stable viscosity at a shear rate of 50 s$^{-1}$ to 1 s$^{-1}$ was recorded.

The viscosity stability data of the resulting hot-melt adhesive formulations are shown in Table 1.

TABLE 1

Thermal Viscosity Stability of EVA28 based Hot-Melt Adhesive Formulations Hot-melts 1-18, Containing the Rosin Esters Prepared in Examples 1-18, Respectively

| Hot-melt formulation | Applied Rosin ester | Acid number (mg KOH/g) | Hydroxyl number (mg KOH/g) | η Initial (Pa · s) | η Aged (Pa · s) | Δ Viscosity (%) |
|---|---|---|---|---|---|---|
| Hot-melt 1 | Rosin ester 1 | 2.6 | 0.8 | 1.205 | 1.225 | 2 |
| Hot-melt 1a | Rosin ester 1a | 4.3 | 1.0 | 1.053 | 1.107 | 5.1 |
| Hot-melt 2 | Rosin ester 2 | 2.5 | 29.5 | 1.285 | 1.418 | 10 |
| Hot-melt 3 | Rosin ester 3 | 32.9 | 1.5 | 1.198 | 1.393 | 16 |
| Hot-melt 4 | Rosin ester 4 | 28.9 | 22.6 | 1.133 | 1.628 | 44 |
| Hot-melt 5 | Rosin ester 5 | 1.4 | 1.4 | 1.263 | 1.273 | 1 |
| Hot-melt 5a | Rosin ester 5a | 1.6 | 1.5 | 1.023 | 1.030 | 0.7 |
| Hot-melt 6 | Rosin ester 6 | 2.0 | 13.4 | 1.24 | 1.373 | 11 |
| Hot-melt 7 | Rosin ester 7 | 1.1 | 11.9 | 1.014 | 1.090 | 7.5 |
| Hot-melt 8 | Rosin ester 8 | 2.5 | 4.4 | 1.257 | 1.303 | 3.6 |
| Hot-melt 9 | Rosin ester 9 | 26.9 | 22 | 1.207 | 1.625 | 34.7 |
| Hot-melt 10 | Rosin ester 10 | 3.9 | 3.1 | 1.017 | 1.060 | 4.3 |
| Hot-melt 11 | Rosin ester 11 | 18.1 | 18.4 | 0.967 | 1.170 | 21.0 |
| Hot-melt 12 | Rosin ester 12 | 4.0 | 0.0 | 1.05 | 1.053 | 0.3 |
| Hot-melt 13 | Rosin ester 13 | 16.0 | 28.5 | 0.908 | 1.193 | 31.4 |
| Hot-melt 14 | Rosin ester 14 | 2.0 | 2.7 | 1.043 | 1.063 | 2.0 |
| Hot-melt 15 | Rosin ester 15 | 2.6 | 0.0 | 1.113 | 1.137 | 2.1 |
| Hot-melt 16 | Rosin ester 16 | 2.1 | 27.9 | 1.123 | 1.303 | 16.0 |
| Hot-melt 17 | Rosin ester 17 | 5.1 | 0.7 | 0.987 | 1.005 | 1.8 |
| Hot-melt 18 | Rosin ester 18 | 17.3 | 20.5 | 0.938 | 1.247 | 33.0 |

η denotes viscosity.
Δ Viscosity denotes the relative difference, expressed as a percent, between the initial viscosity and the viscosity after aging in the thermal stability test adapted from the test methods described in ASTM D4499-07.

Formulation of EVA18 (18% VA Content) Hot-Melt Adhesives

The hot-melt adhesive compositions Hot-melt 19 and Hot-melt 20 of Table 2 were prepared by blending 40 wt % EVATANE® 18-500 EVA (EVA18, EVA copolymer with a 17-19 wt % vinyl acetate content, commercially available from Arkema Inc.) 25 wt % Sasolwax® H1 (unmodified Fischer-Tropsch wax commercially available from Sasolwax), 34.5 wt % rosin ester, and 0.5% IRGANOX® 1010 (commercially available from BASF).

The viscosity stability data of the resulting hot-melt adhesive formulations are shown in Table 2.

TABLE 2

Thermal Viscosity Stability of EVA18 based Hot-Melt Adhesive Formulations Hot-melts 19-20, Containing the Rosin Esters Prepared in Examples 1 and 4, Respectively.

| Hot-melt formulation | Applied Rosin ester | Acid number (mg KOH/g) | Hydroxyl number (mg KOH/g) | η Initial (Pa · s) | η Aged (Pa · s) | Δ Viscosity (%) |
|---|---|---|---|---|---|---|
| Hot-melt 19 | Rosin ester 1 | 2.6 | 0.8 | 1.030 | 1.067 | +3.6 |
| Hot-melt 20 | Rosin ester 4 | 28.9 | 22.6 | 0.937 | 1.170 | +24.9 |

η denotes viscosity.
Δ Viscosity denotes the relative difference, expressed as a percent, between the initial viscosity and the viscosity after aging in the thermal stability test adapted from the test methods described in ASTM D4499-07.

Formulation of EVA33 (33% VA Content) Hot-Melt Adhesives

The hot-melt adhesive compositions Hot-melt 21 and Hot-melt 22 of Table 3 were prepared by blending 40 wt % EVA 33-150 (EVA33, EVA copolymer with a 32-34 wt % vinyl acetate content), 25 wt % Sasolwax® H1 (unmodified Fischer-Tropsch wax commercially available from Sasolwax), 34.5 wt % rosin ester, and 0.5% IRGANOX® 1010 (commercially available from BASF).

The viscosity stability data of the resulting hot-melt adhesive formulations are shown in Table 3.

TABLE 3

Thermal Viscosity Stability of EVA33 based Hot-Melt Adhesive Formulations Hot-melts 21-22, Containing the Rosin Esters Prepared in Examples 1 and 4, Respectively.

| Hot-melt formulation | Applied Rosin ester | Acid number (mg KOH/g) | Hydroxyl number (mg KOH/g) | η Initial (Pa · s) | η Aged (Pa · s) | Δ Viscosity (%) |
|---|---|---|---|---|---|---|
| Hot-melt 21 | Rosin ester 1 | 2.6 | 0.8 | 2.637 | 2.700 | +2.4 |
| Hot-melt 22 | Rosin ester 4 | 28.9 | 22.6 | 2.273 | 3.540 | +55.8 |

η denotes viscosity.
Δ Viscosity denotes the relative difference, expressed as a percent, between the initial viscosity and the viscosity after aging in the thermal stability test adapted from the test methods described in ASTM D4499-07.

Char Particle Formation Determination

20 Gram of hot melt adhesive was placed in an aluminum cup (76 mm bottom diameter, 96 mm top diameter, 125 ml, Type 550125, commercially available from Novelis Deutschland GmbH, D-58840 Plettenberg, Germany) and aged for 9 days at 177° C. After cooling to room temperature all hot melt adhesive material was removed from the cup and re-melted in order to make a thin film out of it (by applying a film applicator). The resulting film was cut into pieces and charged into a 2 L reactor. Toluene (1 L) was added and the mixture was heated to 110° C. After 1 hour heating at 110° C. the insoluble fraction was isolated by filtering the (hot) mixture over a Büchner funnel. The obtained insoluble fraction was dried (30 min/177° C.) and quantified by determining its weight.

The amount of isolated char particles from hot-melt adhesive formulations Hot-melt 21 and Hot-melt 22 are shown in Table 4.

TABLE 4

Char particle formation determination of EVA33 based Hot-Melt Adhesive Formulations Hot-melts 21-22, Containing the Rosin Esters Prepared in Examples 1 and 4, Respectively.

| Hot-melt formulation | Applied Rosin ester | Sample Weight (gram) | Aging Time (day) | Temperature (° C.) | Amount of isolated char (gram) |
|---|---|---|---|---|---|
| Hot-melt 21 | Rosin ester 1 | 20 | 9 | 177 | 2.2 |
| Hot-melt 22 | Rosin ester 4 | 20 | 9 | 177 | 7.1 |

Formulation of Ethylene Butyl Acrylate Copolymer (EnBA35, 35% BA Content) Containing Hot-Melt Adhesives The hot-melt adhesive compositions Hot-melts 23-28 were prepared by blending 40 wt % LOTRYL™ 35-BA-320 (EnBA35, copolymer of ethylene and 33-37 wt % butyl acrylate (BA) content), commercially available from Arkema Inc.), 25 wt % Sasolwax® H1 (unmodified Fischer-Tropsch wax commercially available from Sasolwax), 34.5 wt % rosin ester, and 0.5% IRGANOX® 1010 (commercially available from BASF).

The viscosity stability data of the resulting hot-melt adhesive formulations are shown in Table 5.

TABLE 5

Thermal Viscosity Stability of EnBA35 based Hot-Melt Adhesive Formulations Hot-melts 23-28, Containing the Rosin Esters as Shown in the Second Column from the Left.

| Hot-melt formulation | Applied Rosin ester | Acid number (mg KOH/g) | Hydroxyl number (mg KOH/g) | η Initial (Pa · s) | η Aged (Pa · s) | Δ Viscosity (%) |
|---|---|---|---|---|---|---|
| Hot-melt 23 | Rosin ester 1 | 2.6 | 0.8 | 1.457 | 1.443 | −0.9 |
| Hot-melt 24 | Rosin ester 4 | 28.9 | 22.6 | 1.360 | 1.687 | +24.0 |
| Hot-melt 25 | Rosin ester 10 | 3.9 | 1.1 | 1.607 | 1.583 | −1.5 |
| Hot-melt 26 | Rosin ester 11 | 18.1 | 18.4 | 1.500 | 1.657 | +10.4 |
| Hot-melt 27 | Rosin ester 17 | 5.1 | 0.7 | 1.443 | 1.343 | −6.9 |
| Hot-melt 28 | Rosin ester 18 | 17.3 | 20.5 | 1.400 | 1.577 | +12.6 |

η denotes viscosity.
Δ Viscosity denotes the relative difference, expressed as a percent, between the initial viscosity and the viscosity after aging in the thermal stability test adapted from the test methods described in ASTM D4499-07.

Char Particle Formation Determination

20 Gram of hot melt adhesive was placed in an aluminum cup (76 mm bottom diameter, 96 mm top diameter, 125 ml, Type 550125, commercially available from Novelis Deutschland GmbH, D-58840 Plettenberg, Germany) and aged for 10 days at 177° C. After cooling to room temperature all hot melt adhesive material was removed from the cup and re-melted in order to make a thin film out of it (by applying a film applicator). The resulting film was cut into pieces and charged into a 2 L reactor. Toluene (1 L) was added and the mixture was heated to 110° C. After 1 hour heating at 110° C. the insoluble fraction was isolated by filtering the (hot) mixture over a Büchner funnel. The obtained insoluble fraction was dried (30 min/177° C.) and quantified by determining its weight.

The amount of isolated char particles of hot-melt adhesive formulations Hot-melt 23 and Hot-melt 24 are shown in Table 6.

TABLE 6

Char particle formation determination of EnBA35 based Hot-Melt Adhesive Formulations Hot-melts 23-24, Containing the Rosin Esters Prepared in Examples 1 and 4, Respectively.

| Hot-melt formulation | Applied Rosin ester | Sample Weight (gram) | Aging Time (day) | Temperature (° C.) | Amount of isolated char (milligram) |
|---|---|---|---|---|---|
| Hot-melt 23 | Rosin ester 1 | 20 | 10 | 177 | 0 |
| Hot-melt 24 | Rosin ester 4 | 20 | 10 | 177 | 625 |

Formulation of EnBA35 and EVA28 Containing Hot-Melt Adhesives

The hot-melt adhesive compositions Hot-melt 29 and Hot-melt 30 of Table 7 were prepared by blending 12 wt % Elvax® 220 (EVA copolymer with a 28 wt % vinyl acetate content, commercially available from DuPont™ Inc.), 12 wt % Escorene™ Ultra UL 7720 (EVA copolymer with a 27.6 wt % vinyl acetate (VA) content, commercially available from ExxonMobil Chemical, Inc.), 16 wt % LOTRYL™ 35BA320 (EnBA35, copolymer of ethylene and 33-37 wt % butyl acrylate (BA) content, commercially available from Arkema, Inc.), 25% Sasolwax® 6805 (paraffin wax, commercially available from Sasolwax), 34.5 wt % Rosin Ester and 0.5 wt % IRGANOX® 1010 (commercially available from BASF).

The viscosity stability data of the resulting hot-melt adhesive formulations are shown in Table 7.

TABLE 7

Thermal Viscosity Stability of EVA28/EnBA35 based Hot-Melt Adhesive Formulations Hot-melts 29-30, Containing the Rosin Esters Prepared in Examples 14 and 4, Respectively.

| Hot-melt formulation | Applied Rosin ester | Acid number (mg KOH/g) | Hydroxyl number (mg KOH/g) | $\eta$ Initial (Pa.s) | $\eta$ Aged (Pa·s) | Δ Viscosity (%) |
|---|---|---|---|---|---|---|
| Hot-melt 29 | Rosin ester 14 | 2.0 | 2.7 | 1.640 | 1.663 | +1.4 |
| Hot-melt 30 | Rosin ester 4 | 28.9 | 22.6 | 1.430 | 2.097 | +46.6 |

$\eta$ denotes viscosity.
Δ Viscosity denotes the relative difference, expressed as a percent, between the initial viscosity and the viscosity after aging in the thermal stability test adapted from the test methods described in ASTM D4499-07.

Formulation of EnBA35 and EVA28 Containing Hot-Melt Adhesives Which Contain More Than One Tackifier The hot-melt adhesive compositions Hot-melt 31 and Hot-melt 32 of Table 8 were prepared by blending 35 wt % EVATANE®28-420 (EVA28, EVA copolymer with a 27-29 wt % vinyl acetate (VA) content, commercially available from Arkema, Inc.), 5 wt % LOTRYL™ 35BA320 (EnBA35, copolymer of ethylene and 33-37 wt % butyl acrylate (BA) content, commercially available from Arkema, Inc.), 5 wt % ZONATAC® NG 98 (styrenated terpene resin, commercially available from Arizona Chemical Company, LLC), 5 wt % Escorez™ 5600 (aromatic modified cycloaliphatic hydrocarbon resin, commercially available from ExxonMobil Chemical, Inc.), 5 wt % SYLVARES™ SA120 (aromatic hydrocarbon resin, commercially available from Arizona Chemical Company, LLC), 24.5 wt % rosin ester, 20 wt % Sasolwax® H1 (unmodified Fischer-Tropsch wax, commercially available from Sasolwax), 0.5 wt % IRGANOX® 1010 (commercially available from BASF).

The viscosity stability data of the resulting hot-melt adhesive formulations are shown in Table 8.

TABLE 8

Thermal Viscosity Stability of EVA28/EnBA35 based Hot-Melt Adhesive Formulations Hot-melts 31-32, Containing Several Tackifiers and the Rosin Esters Prepared in Examples 14 and 4, Respectively.

| Hot-melt formulation | Applied Rosin ester | Acid number (mg KOH/g) | Hydroxyl number (mg KOH/g) | $\eta$ Initial (Pa·s) | $\eta$ Aged (Pa·s) | Δ Viscosity (%) |
|---|---|---|---|---|---|---|
| Hot-melt 31 | Rosin ester 14 | 2.0 | 2.7 | 1.540 | 1.593 | +3.5 |
| Hot-melt 32 | Rosin ester 4 | 28.9 | 22.6 | 1.413 | 1.963 | +38.9 |

$\eta$ denotes viscosity.
Δ Viscosity denotes the relative difference, expressed as a percent, between the initial viscosity and the viscosity after aging in the thermal stability test adapted from the test methods described in ASTM D4499-07.

As shown in Table 1, upon incubation at 177° C. for 96 hours, the percentage change in viscosity of a composition containing a rosin ester having both a high hydroxyl number and a high acid number (Rosin Ester 4) can be higher than the sum of the percentage change in viscosity of a composition containing a rosin ester having only a low hydroxyl number (Rosin Ester 3) and the percentage change in viscosity of a composition containing a rosin ester having only the low acid number (Rosin Ester 2). This synergistic (i.e., larger than additive) effect was unexpected.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

The term "comprising" and variations thereof as used herein is used synonymously with the term "including" and variations thereof and are open, non-limiting terms.

Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A composition comprising,
   (a) a polymer derived from ethylene polymer derived from at least one polar monomer with one or more ester groups, which polymerize with ethylene, and
   (b) a rosin ester having a hydroxyl number and an acid number,
   wherein the rosin ester has a hydroxyl number of six or less, and
   wherein the sum of the hydroxyl number and the acid number is eighteen or less, and
   wherein the rosin ester has a weight average molecular weight of from 800 g/mol to 2000 g/mol.

2. The composition of claim 1, wherein the rosin ester has a hydroxyl number of five or less.

3. A composition comprising,
   (a) ethylene polymer derived from at least one polar monomer with one or more ester groups, which polymerize with ethylene, and
   (b) a rosin ester having a hydroxyl number and an acid number,
   wherein the sum of the hydroxyl number and the acid number is ten or less, and
   wherein the rosin ester has a weight average molecular weight of from 800 g/mol to 2000 g/mol.

4. The composition of claim 3, wherein the rosin ester has a hydroxyl number of six or less.

5. A composition comprising:
   (a) An ethylene polymer derived from at least one polar monomer with one or more ester groups, which polymerize with ethylene, and
   (b) a rosin ester,
   wherein the rosin ester has a hydroxyl number of six or less and an acid number of fifteen or less, and
   wherein the rosin ester has a weight average molecular weight of from 800 g/mol to 2000 g/mol.

6. The composition of claim 5, wherein the rosin ester has a hydroxyl number of five or less.

* * * * *